(12) United States Patent
Golan et al.

(10) Patent No.: US 10,464,218 B2
(45) Date of Patent: Nov. 5, 2019

(54) CONVERTIBLE FRICTIONLESS TO FRICTIONAL FINGERTIPS FOR A GRIPPER TO IMPROVE ROBOTIC GRASP ROBUSTNESS

(71) Applicants: B.G. NEGEV TECHNOLOGIES AND APPLICATIONS LTD., AT BEN-GURION UNIVERSITY, Beer-Sheva (IL); TECHNION RESEARCH & DEVELOPMENT FOUNDATION LIMITED, Haifa (IL)

(72) Inventors: Yoav Golan, Tel Aviv (IL); Amir Shapiro, Meitar (IL); Elon Rimon, Nofit (IL)

(73) Assignees: B.G. NEGEV TECHNOLOGIES AND APPLICATIONS LTD., AT BEN-GURION UNIVERSITY, Beer-Sheva (IL); TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 16/190,813

(22) Filed: Nov. 14, 2018

(65) Prior Publication Data

US 2019/0077028 A1   Mar. 14, 2019

Related U.S. Application Data

(63) Continuation-in-part of application No. PCT/IL2017/050532, filed on May 15, 2017.
(Continued)

(51) Int. Cl.
*B25J 15/10* (2006.01)
*B25J 15/02* (2006.01)
(Continued)

(52) U.S. Cl.
CPC ......... *B25J 15/103* (2013.01); *B25J 15/0009* (2013.01); *B25J 15/0028* (2013.01);
(Continued)

(58) Field of Classification Search
CPC .... B25J 15/0004; B25J 15/0038; B25J 15/02; B25J 15/10; B25J 15/103; B25J 15/106;
(Continued)

(56) References Cited

U.S. PATENT DOCUMENTS 4,353,537 A * 10/1982 Koufos ............... B25B 1/20
                                                          192/107 C
4,653,793 A    3/1987 Guinot et al.
(Continued)

OTHER PUBLICATIONS

International Search Report for PCT/IL2017/050532, dated Sep. 11, 2017, 3 pages.
(Continued)

*Primary Examiner* — Dean J Kramer
(74) *Attorney, Agent, or Firm* — Nixon & Vanderhye P.C.

(57) ABSTRACT

The present invention relates to a gripper system comprising fingers. The gripper fingers are connectable to a gripper arm. The gripper fingers comprise a roller configured to spin around its central axis or a ball element rotatable in any direction; a stopper configured to stop and/or prevent the spinning of the roller or ball. The present invention also relates to a method for grasping and displacing an object.

23 Claims, 17 Drawing Sheets

Related U.S. Application Data

(60) Provisional application No. 62/336,669, filed on May 15, 2016, provisional application No. 62/589,607, filed on Nov. 22, 2017.

(51) Int. Cl.
*B25J 15/00* (2006.01)
*B25J 15/08* (2006.01)

(52) U.S. Cl.
CPC ............. *B25J 15/02* (2013.01); *B25J 15/026* (2013.01); *B25J 15/086* (2013.01); *B25J 15/106* (2013.01)

(58) Field of Classification Search
CPC .... B25J 15/0028; B25J 15/026; B25J 15/086; Y10S 294/902
USPC .................................................. 294/86.4, 902
See application file for complete search history.

(56) References Cited

U.S. PATENT DOCUMENTS

| | | | | |
|---|---|---|---|---|
| 4,740,025 A | * | 4/1988 | Nelson | B01L 9/50 294/902 |
| 5,120,101 A | * | 6/1992 | Vranish | B25J 15/0028 294/119.1 |
| 6,918,735 B2 | * | 7/2005 | Urban | H01L 21/68707 294/106 |
| 8,733,810 B2 | * | 5/2014 | Oda | B25J 15/083 294/86.4 |
| 2003/0102640 A1 | | 6/2003 | Saito | |
| 2014/0255129 A1 | | 9/2014 | Kenner | |
| 2015/0123416 A1 | * | 5/2015 | Kitamura | B25J 15/0038 294/207 |
| 2015/0151438 A1 | | 6/2015 | Hecht et al. | |
| 2017/0036354 A1 | | 2/2017 | Chavan Dafle et al. | |

OTHER PUBLICATIONS

Written Opinion of the ISA for PCT/IL2017/050532, dated Sep. 11, 2017, 4 pages.
Allen et al., "Two-fingered caging of polygons via contact-space graph search." Robotics and Automation (ICRA), 2012 IEEE International Conference on. IEEE, May 14-18, 2012, pp. 4183-4189.

* cited by examiner

Mechanical compliance for braking alignment

Spring loading mechanism to change force required to brake

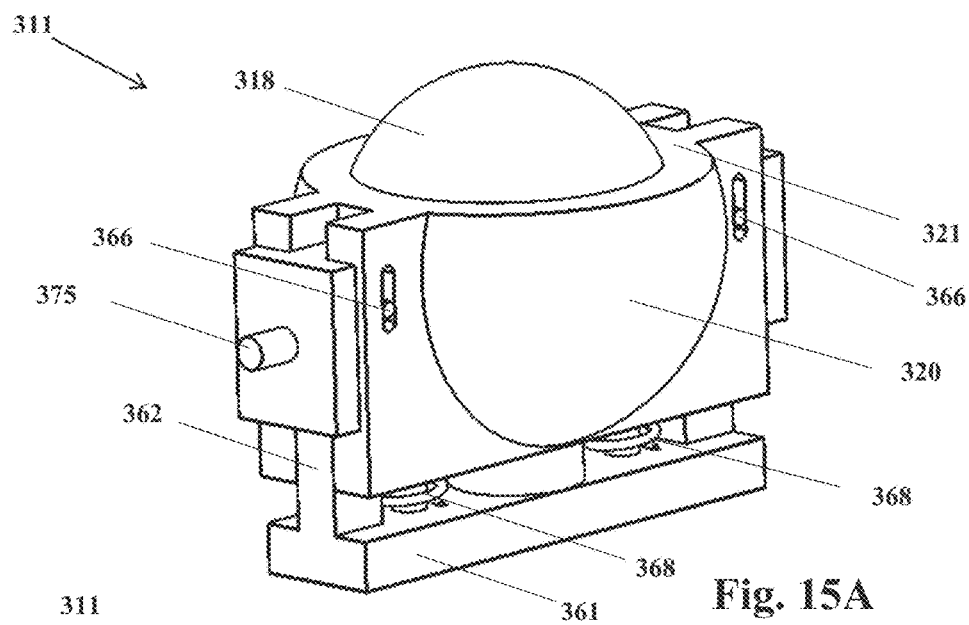
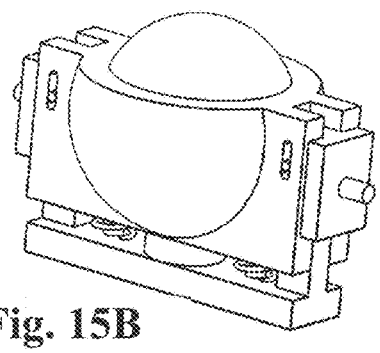
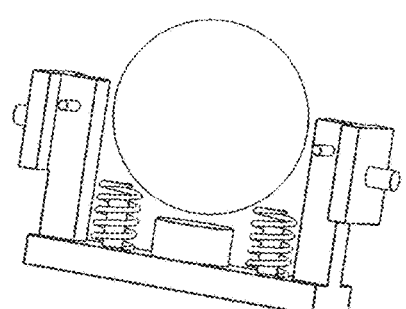
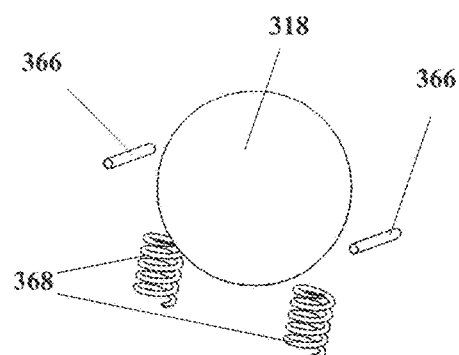

CONVERTIBLE FRICTIONLESS TO FRICTIONAL FINGERTIPS FOR A GRIPPER TO IMPROVE ROBOTIC GRASP ROBUSTNESS

This application is Continuation-in-part of International Application No. PCT/IL2017/050532 filed 15 May 2017, which designated the U.S. and claims priority to U.S. Application No. 62/336,669 filed 15 May 2016. This application also claims priority to U.S. Application No. 62/589,607 filed 22 Nov. 2017, the entire contents of each of which are hereby incorporated by reference.

FIELD OF THE INVENTION

The present invention relates to the field of mechanics. More particularly, the present invention relates to a mechanical gripper comprising fingertips providing a robust grasp.

BACKGROUND OF THE INVENTION

Conventional mechanical grippers use several "fingers" that can be either rigid or non-rigid and that retract/close upon an object to form a grasp. The grasp geometry is usually predetermined, and in most cases grippers can only grasp specific objects by forming contact with specific points on it. Grippers that are meant to be versatile usually rely on redundancy (a large number of fingers), or soft, flexible fingers. Versatile grippers often lack the ability to withstand large external wrenches applied to the grasped object due to their flexible nature. Rigid grippers specified for specific object manipulation (such as those in an industrial assembly line) are good at withstanding external wrenches applied on the grasped object but in many cases cannot grasp even a slightly different object without corresponding hardware and/or software adaptation.

Fingertips of grippers are traditionally rigid, made of plastic, metal, hard rubber etc. The fingertips are designed to contact the object in a manner that does not harm it, while applying direct force and frictional force that suffice to manipulate the object and withstand external wrenches applied to it. The contact points are predetermined and often even predesigned to fit the fingertip for improved grasping.

While existing grippers are good at manipulating predetermined objects, there is a need for gripping devices that can grasp differently shaped objects without prior knowledge of their geometry, and manipulate them. The present invention is directed toward providing such a solution.

"Blind" closing of gripper fingers onto an object without predetermination of the contact locations can result in either:
  A. An immobilizing grasp;
  B. "Jamming" (an unstable, frictional grasp);
  C. The object will escape and not be grasped.

If the fingers are retracted from what is known as a "caging" position, option C will not occur regardless of the finger type. Frictionless fingertips will result (in most cases) in option A. The fingers will close onto the object, which in turn will move within the retracting cage, until there is no further possible movement and the volume of the cage is zero, constituting an immobilizing grasp. Frictional fingertips will result (in most cases) in option B. The frictional contacts are likely to create a frictional grasp within the cage with positive non-zero volume, leaving room for the object to move if dislodged from the frictional contacts given a sufficient external wrench. Both A and B are considered feasible grasps, however they may be susceptible to external wrenches applied on the object, resulting in a loss of fingertip-object contact, or a "sliding" of the object along the fingertips. In case A this could occur due to the natural compliance and flexibility of the robotic gripper and of the object, and the lack of frictional forces to resist a sliding motion. In case B this could occur due to external wrenches dislodging the frictional contacts from their grasping positions, resulting in a freely-moving object (within the cage). A combination of an immobilizing grasp that is also a frictional grasp is the most robust to such external wrenches, but is difficult to obtain without engineering the contact in advance. Indeed, most manipulation applications utilize such grasps by exactly placing frictional fingertips in predetermined positions on the object that form an immobilizing grasp.

US2017/0036354 relates to a two-phase gripper. The gripper reorients and grasps an object while being picked up. The gripper includes a parallel jaw gripper including a pair of opposed, two-phase fingers, each finger including a cavity covered by an elastic strip wherein the elastic strip includes a point contact. Closure of the jaws of the gripper on as object at a first relatively lower force results in contact with lower friction between the point contact on the elastic strip on the fingers and the object allowing the object to rotate under gravity as the gripper is raised. Thereafter, closure of the jaws of the gripper on the object at a second relatively higher force causes the elastic strip to receded into the cavity resulting in multi-point contact with higher friction between the fingers and the object to securely grasp the object.

It is therefore an object of the present invention to provide a method and means for a robust versatile grasping of a variety of differently shaped objects.

It is a further object of the present invention to provide a method and means for a robust versatile grasping with minimal or no physical adaptation required to the manipulated objects.

Other objects and advantages of the present invention will become apparent as the description proceeds.

SUMMARY OF THE INVENTION

The present invention relates to a gripping system comprising fingers that can be adjusted from being frictionless fingers to frictional fingers. When being frictionless, the object to be grasped can be reoriented to an improved position, an immobilizing position. When the improved position is reached the fingers are adjusted to be frictional fingers thus capable of carrying out a robust frictional immobilizing grasp.

According to an embodiment of the present invention, each gripper finger is mounted on a gripper arm and is mobile thereon along the arm. The arms are positioned such that the fingers may close on an object and engage it. A motor drives a movable member (to which the finger is attached to) along the arm.

The present invention relates to fingers capable of being used in said system. According to an embodiment of the present invention, the fingers comprise a rotatable cylinder thereon configured to be stopped (and configured to be prevented of being rotated) by a stopping element engageable therewith. Preferably, the deflection of the rotatable cylinder (in relation to its initial central axis) causes the engagement with the stopping element. A spring mechanism may be used to adjust the force needed to deflect the rotatable cylinder. The stopping mechanism may be associated with braking mechanism alignment by mechanical compliance. The present invention may allow braking by force thresholding regardless of surface orientation.

The present invention relates to a gripper finger comprising:
a movable base element connectable to a gripper arm;
a roller configured to spin around its central axis;
a stopper configured to stop and/or prevent the spinning of the roller around its central axis.

Preferably, the roller is mounted on a rod at its central axis;
wherein said rod is deflectable such that said roller is configured to engage the stopper.

Preferably, said finger further comprises an elongated portion extending along an axis perpendicular to the central axis of the roller, with an aperture provided at the bottom of said elongated portion, wherein the rod is mounted such that is passes through said aperture; and
wherein the stopper is connected to said elongated portion at a location distal to said aperture.

Preferably, the elongated portion is rotatable around an axis identical or parallel to the roller central axis and wherein the aperture is essentially elongated in the direction of the length of said elongated portion enabling the deflection of the rod.

Preferably, the elongated portion is rotatable around an axis parallel to the roller central axis such that there is an offset between the central axis of the roller and the rotation axis of said elongated portion.

Preferably, the central axis of the roller is distal to the central rotation axis of the elongated portion rotation.

Preferably, the elongated portion is hollow and wherein an elastic element is placed within the hollow portion, wherein the rod is responsive to compression of said elastic element.

Preferably, the elastic element is a spring.

Preferably, the gripper finger further comprises a nut and bolt mechanism configured to compress or expand the elastic element.

Preferably, the stopper comprises protrusions on its proximal side.

Preferably, the aperture comprises an elongated circle (or oval) shape.

Preferably, the base element comprises a hollow cylindrical tube extending therefrom;
wherein said finger further comprises a cylindrical portion connected to a proximal portion of the top of the elongated portion and inserted within said hollow cylindrical tube and rotatable therewithin;
wherein said hollow cylindrical tube and said cylindrical portion have a common central axis;
wherein said common central axis is the rotation axis of said elongated portion.

Preferably, the cylindrical portion comprises a bore extending from the inside of the hollow portion to within said cylindrical portion;
wherein said bore is substantially parallel to the rotation axis of said elongated portion;
wherein the rod is placed within said bore; and
wherein the stopper extends from a distal portion of the bottom of the hollow portion and is substantially parallel to the rotation axis of said elongated portion.

Preferably, the gripper finger further comprises a second rod mounted within the hollow tube and is placed perpendicularly to the rotation axis of the elongated portion;
wherein the cylindrical portion comprises a partial slot perpendicular to the rotation axis of the elongated portion;
wherein said second rod is located within said slot and configured to limit the rotation of said cylindrical portion.

The present invention relates to a method for grasping and displacing an object comprising:
engaging said object with a plurality of movable fingers;
optimizing the grip with a substantially frictionless engagement;
immobilizing said object by adjusting frictional properties of said fingers.

Preferably, the adjusting frictional properties is by increasing friction.

Preferably, the adjusting frictional properties comprises stopping the rotation of a roller.

Preferably, stopping the rotation of a roller is by deflecting the roller central axis and/or engaging said roller with a stopper.

The present invention relates to a gripper system comprising:
a plurality of arms wherein the proximal ends of each of the arms are at close proximity to each other, wherein each of said arms comprises a mobile member movable thereon;
a motor configured to drive said mobile member;
a control unit;
a plurality of gripper fingers as explained herein, each mounted on a corresponding mobile member of said mobile members.

Preferably, the gripper system further comprises one or more sensors selected from the group consisting of torque sensors, velocity sensors, orientation sensors, contact sensor, and force sensors.

Preferably, the gripper system comprises a lead screw and follower mechanism, wherein the system comprises a lead screw rotatable (rotatably driven) by the motor and the system comprises a follower element which is part of the mobile member.

The present invention relates to a gripper finger comprising a proximal ball. The ball is encased within an encasing element. The ball is configured to move between two modes. A first mode when the ball is freely rotatable in any direction and a second mode when the ball is stopped and prevented from rotating.

Preferably, the prevention of rotation is carried out by engaging the ball with a stopping element such that the friction therebetween prevents the ball from rotating. The stopping element may be a surface engageable with the ball.

The present invention relates to a gripper finger comprising:
a hollow receiving cup comprising an opening at its proximal side and a plurality of surfaces within its interior;
a ball encasing element comprising a distal side with a plurality of surfaces and a proximal side in the form of the majority of an external surface of a ball;
a ball encased within said ball encasing element;
a plurality of elastic elements;
wherein said encasing element comprises an aperture within each of said distal side surfaces;
wherein said ball encasing element is placed within the interior of said receiving cup such that each of said ball encasing element distal side surfaces faces a corresponding surface from said hollow receiving cup internal surfaces;
and wherein at least one of said plurality of elastic elements is placed between each of said encasing element distal side surfaces and its corresponding hollow receiving cup internal surface that it faces.

Preferably, the ball encasing element distal side surfaces and the hollow receiving cup surfaces within its interior are flat.

Preferably, the ball encasing element distal side comprises three surfaces; and wherein the hollow receiving cup comprises three surfaces within its interior.

Preferably, both the ball encasing element distal side surfaces and the receiving cup plurality of surfaces within its interior, are in the form of three orthogonal triangular faces meeting at a common vertex corner placed distally to said three orthogonal triangular faces.

Preferably, the ball encasing element comprises a circular opening at its proximal end, wherein a portion of the ball is proximal beyond said circular opening.

Preferably, a portion of the ball encased within the ball encasing element protrudes the aperture.

Preferably, each ball encasing element distal surface is displaceable towards its corresponding receiving cup interior surface that it faces, such that the portion of the ball that protrudes the aperture of said ball encasing element distal surface is engageable with said corresponding receiving cup interior surface.

Preferably, the ball and the receiving cup interior surface that it is engageable with are constructed such that there is friction upon their engagement.

Preferably, the elastic elements are springs.

Preferably, said finger comprises two elastic elements placed between each of the encasing element distal side surfaces and its corresponding hollow receiving cup internal surface that it faces.

Preferably, each ball encasing element distal surface comprises two recesses at both sides of the aperture, wherein each elastic element extends from within a recess of said recesses.

Preferably, the ball encasing element distal side three surfaces are orthogonal to one another; and
wherein the hollow receiving cup interior three surfaces are orthogonal to one another.

Preferably, the hollow receiving cup internal surfaces are concave spherical surfaces, such that they share a center point with each other and with the ball when said ball is in a resting position.

The present invention relates to a gripper finger comprising:
a distal base comprising a distal surface and two side arms extending proximally therefrom;
a circumferential ring connected to said distal base two side arms such that said circumferential ring is rotatable around a first axis;
a braking unit comprising:
a) a ball encasing element configured to encase a ball therewithin;
b) a ball encased within said ball encasing element;
c) a stopper unit connected to said ball encasing element such that said ball encasing element is movable in relation to said stopper unit;
wherein said braking unit is connected to said circumferential ring such that said braking unit is rotatable around a second axis.

Preferably, the stopper unit comprises a distal portion distal to the ball; wherein said stopper unit distal portion comprises a stopper element extending proximally therefrom; and
wherein said stopper element is configured to engage and immobilize the ball.

Preferably, the ball encasing element comprises:
a) an interior round surface in the form of the majority of an outer surface of a ball terminating at a proximal opening;
b) a distal aperture;
wherein a portion of the braking unit ball is proximal to said proximal opening;
wherein said stopper element is configured to pass through said ball encasing element distal aperture.

Preferably, the ball encasing element is movable in relation to the stopper unit substantially in the distal and proximal direction.

Preferably, at least one elastic element is placed between a portion of the stopper unit and the ball encasing element.

Preferably, the at least one elastic element is a spring.

Preferably, the connection between the distal base two side arms and the circumferential ring is such that each side arm is connected to a connection point on the circumferential ring by a revolute joint; and
wherein the connection between the braking unit and the circumferential ring is such that two sides of said braking unit are connected to connection points on the circumferential ring by revolute joints.

Preferably, the first axis is perpendicular to the second axis.

Preferably, the first axis and the second axis are on the same plane.

Preferably, the circumferential ring comprises a rectangular shape.

Preferably, the ball encasing element comprises two side channels;
wherein the distal stopper unit comprises two side arms placed within said side channels and are configured to move distally and proximally therein;
wherein said side channels each comprise a pair of elongated aligned apertures;
wherein said distal stopper unit two side arms each comprise an aperture aligned with a portion of a corresponding pair of said pair of elongated aligned apertures;
wherein a pin is inserted through each of said pairs of elongated aligned apertures and said corresponding distal stopper unit side arm aperture.

The present invention relates to a method for grasping and displacing an object comprising:
engaging said object with a plurality of movable fingers;
optimizing the grip with a substantially frictionless engagement;
immobilizing said object by adjusting frictional properties of said fingers comprising stopping the rotation of a ball.

Preferably, the stopping of the rotation of a ball is by deflecting the ball and engaging a portion of said ball with a stopping surface.

Preferably, the stopping of the rotation of a ball is by moving the ball in a general distal direction and engaging a portion of said ball with a stopper element.

The present invention relates to a gripper finger comprising:
a ball encasing element;
a ball encased within said ball encasing element wherein a portion of said ball is proximal beyond said ball encasing element proximal side;
wherein said ball is configured move between two modes:
a) a frictionless mode wherein said ball is freely rotatable in any direction;
b) a frictional mode wherein the ball is immobilized.

Preferably, in the frictional mode the ball is engageable with a stopper element.

Preferably, the stopper element is a surface that is engageable with (that is configured to contact) the ball.

The present invention relates to a gripper system comprising:
a central arm connectable to a robotic maneuvering system configured to maneuver said central arm;

three arms extending proximally from said central arm, wherein each of said three arms comprises at least three revolute joints;

four gripper fingers according to the fingers explained herein, wherein one of said four gripper fingers is attached to the proximal end of said central arm and three of said four gripper fingers are each attached to the proximal end of a corresponding arm of said three arms;

at least one motor configured to radially displace said revolute joints (i.e. configured to radially move a portion of the arm connected to one side of the joint (e.g. connected to a pin) in relation to the other side of the joint (e.g. connected to an aperture that said pin is inserted through forming the revolute joint));

a control unit.

Preferably, the system further comprising one or more sensors selected from the group consisting of torque sensors, velocity sensors, angular velocity sensors, orientation sensors, contact sensor, and force sensors;

wherein said one or more sensors are coupled to the control unit.

Typically, the control unit (as explained herein in relation to any one of the embodiments) comprises a processor configured to read sensor data and control the motor/motors accordingly.

BRIEF DESCRIPTION OF THE DRAWINGS

The present invention is illustrated by way of example in the accompanying drawings, in which similar references consistently indicate similar elements and in which:

FIGS. 15A-15D illustrate a braking unit according to an embodiment of the present invention.

DETAILED DESCRIPTION OF THE INVENTION

Figure 1:
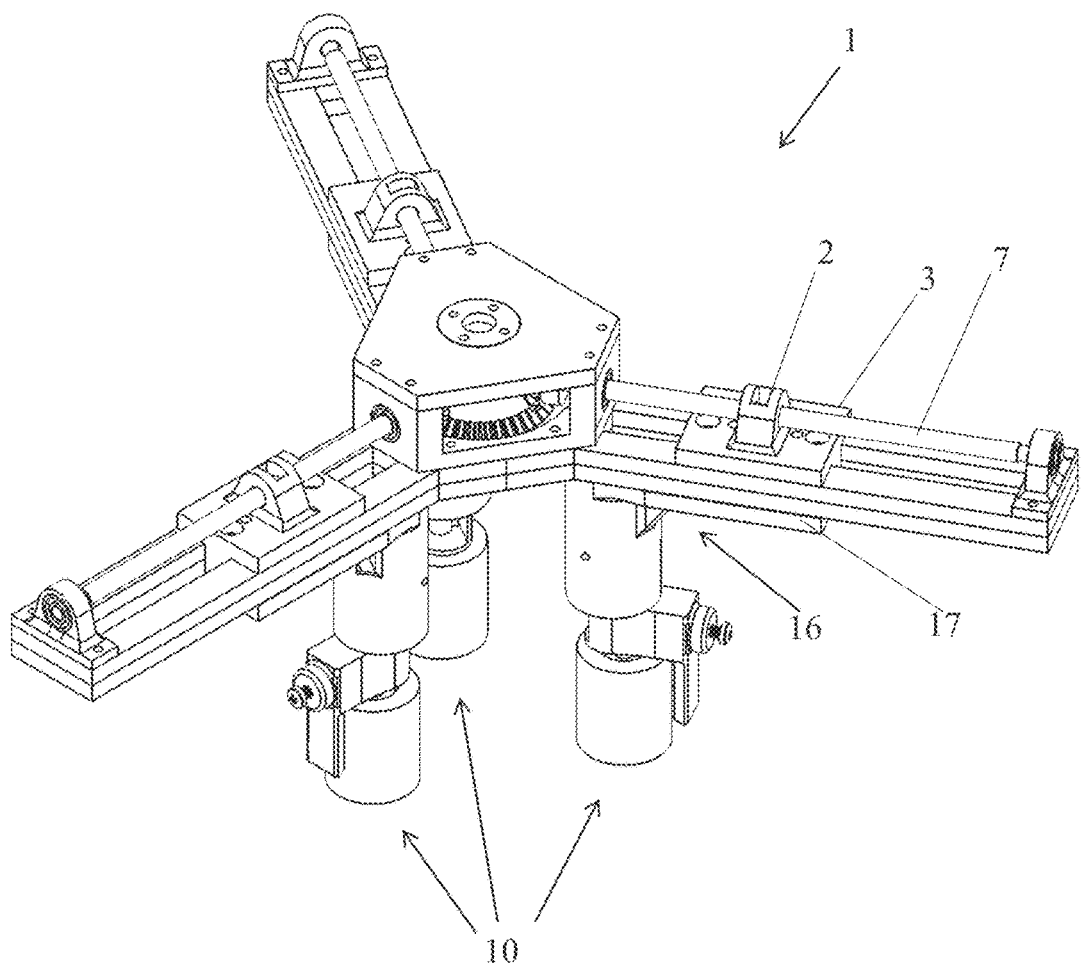
FIG. 1 illustrates an embodiment of the system of the present invention.

The present invention relates to a gripping method and device. Particularly, the present invention relates to fingertips for a gripper that improves its gripping ability. Specifically, the invention relates to a novel concept of utilizing contact dynamics to improve grasp robustness. The present invention is also further applicable to object manipulation, tool operation and industrial assembly lines. The invention focuses on novel fingertips for multi-fingered mechanical grippers (and in some cases single-fingered grippers).

The present invention relates to a method and means for grasping with fingertips that are convertible from being nearly frictionless at a first stage and highly frictional at a second stage. The conversion is carried out through active or passive actuation. The friction-convertible fingertips allow a frictionless closing of the fingers onto an object, thus allowing relative movement (e.g. rotation and translation) of the object being gripped. The frictionless engagement of the fingers with the object may cause the grasped object to adapt its position to a "centralized" position such that the grasp connection points are locally minimally distanced from one another. Such a grasping position ensures that the geometry of the gripped object itself resists external wrenches, and is guaranteed to constitute a feasible grasp. Furthermore, since there are a finite, positive number of locally minimal distant contact configurations for a given gripper and object, the gripper is guaranteed to grasp the object at well-defined points, removing the need for object pose estimation after grasping.

Subsequently, the frictionless immobilizing grasp is then transformed into a more robust frictional immobilizing grasp by converting the fingertips into frictional fingertips. After conversion to friction contacts, the resulting grasp is more robust than either a frictionless immobilizing or jamming grasp. The contact points are such that the cage has zero-volume, and the geometry of the object itself resists external wrenches, therefore it cannot be dislodged as in the case of jamming. Unlike the case of frictionless contacts however, local "slipping" of the fingertips along the objects perimeter due to external wrenches and natural compliance is much less prone to occur, as the frictional contacts can create frictional forces that may counteract this slippage. Thus, the frictional contacts at an immobilizing grasp position offers qualities that are difficult to obtain with solely frictional or frictionless contacts.

The moment of friction conversion can be determined actively or passively. The final fingertip locations on the object perimeter can be derived from existing techniques, such as a graph search for locally minimal distant points conforming to a gripper shape (e.g. Allen, Thomas, Joel Burdick, and Elon Rimon, "Two-fingered caging of polygons via contact-space graph search." Robotics and Automation (ICRA), 2012 IEEE International Conference on. IEEE, 2012.), and upon recognition of such fingertip placements the frictional mode may be activated. Alternatively, one may recognize that an immobilizing grasp exists through the knowledge that further retraction is no longer possible. If the gripper attempts to retract the frictionless fingers further upon the object, and is unsuccessful, it is implied that the object is in an immobilizing grasp, because otherwise it would continue to rotate and translate within the cage, allowing further finger retraction. When frictionless retraction is completed an immobilizing grasp occurs, allowing a mechanical device portion to convert the fingertips into frictional fingertips without external stimuli.

According to a preferred aspect of the present invention, the conversion between frictionless and frictional fingertips is obtained by using a rolling mechanism. The fingertips comprise a roller which at a first stage is rotatable around its central axis. When lateral forces are applied between the roller and the object to be grasped, frictional forces do not occur therebetween, but rather the object may be movable along the roller which rotates accordingly. To convert the roller into a frictional body, a "brake" action is applied to the roller. This is similar to a car tire, which is free to roll along its axis and does not (ideally) create friction forces that slow the vehicle down, however when the brakes are applied, the tire is no longer free to roll, and creates friction forces. This type of roller can be cylindrical (as a tire), spherical, or any other axisymmetric shape or special shape that permits the application of this concept. Most preferably, the roller is cylindrical.

The "roller braking" may be applied actively using standard braking mechanisms or specialized braking mechanisms, based on predetermined time, location or other gripping based parameters that trigger the braking mechanism. Alternatively, braking may be applied through finger-object interaction, i.e. based on force applied to the fingertips with an internal mechanism that triggers the brakes when the force exceeds a predetermined threshold. Such a force would be applied when retraction/closure is completed and the object in an optimal position/orientation to be grasped. Then the fingertips in an immobilizing grasp position become frictional.

Figure 2:
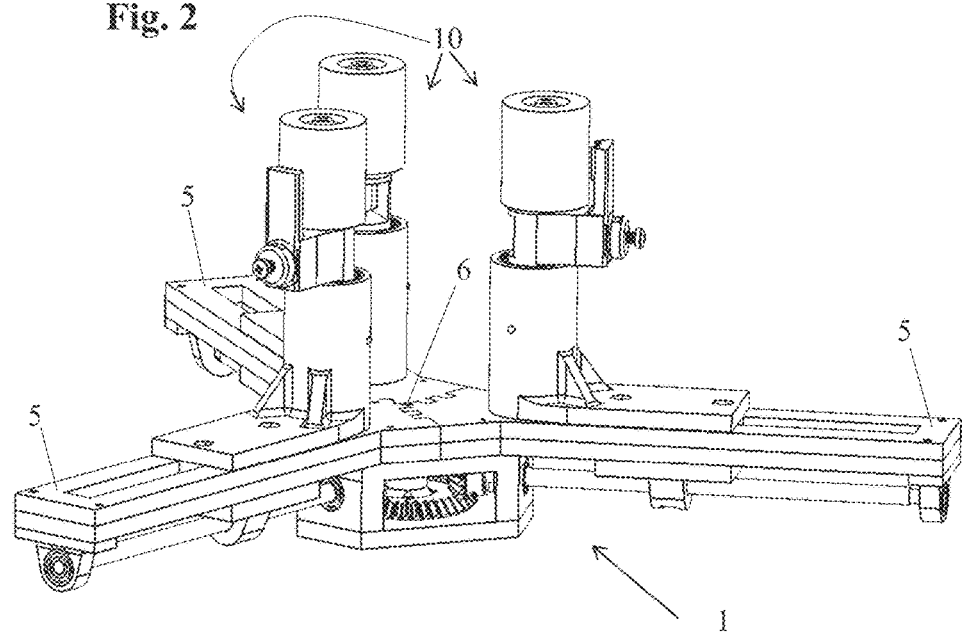
FIG. 2 illustrates an upside-down embodiment of the system of the present invention.

FIG. 1 illustrates an embodiment of the present invention comprising a gripping system 1 with three fingers 10 (but can actually be used with any single or plurality of fingers and corresponding arms). FIG. 2 illustrates an upside-down gripping system 1 in order to obtain a better understanding of the invention. The three fingers 10 are connected and movable along three corresponding arms 5 of the gripping system 1 that extend outwards from a central common point 6. Optionally the arms 5 do not have to actually touch each other but their proximal ends must be at a close enough proximity to each other, to enable grasping a required object. Preferably the arms 5 are located on a common horizontal plane. When grasping an object, the three fingers close in on the object to be grasped by moving along the arms 5 from outwards towards inwards to the central point 6. The fingers 10 comprise fingertip rollers 40 at their edges (the edges far from the arms 5) that are configured to engage the object to be grasped. When the fingers 10 engage the object to be grasped, the fingers 10 fingertip rollers 40 roll upon pressures applied on them. At first the force required to move the fingers is near-zero, and only exists to overcome the gripper system's energy losses (friction, heat, noise etc.), and to a certain degree to transfer kinetic energy to the object, enabling it to adjust its position/orientation until it reaches a steady state. This steady state is that in which no more energy is transferred to the object by the fingers, and they are both stationary (in an immobilizing grasp). Then, force may be applied from the enclosing fingers causing a reactive normal force from the object sides engaging the rollers 40, pushing them back. This pushing of the rollers 40 causes the triggering of the roller braking mechanism (roller stopper) after the normal force of the pushing of the rollers 40 exceeds a certain force threshold. Then the rollers 40 cannot rotate and act as efficient frictional fingertips providing an efficient robust grasp.

Figure 3A:
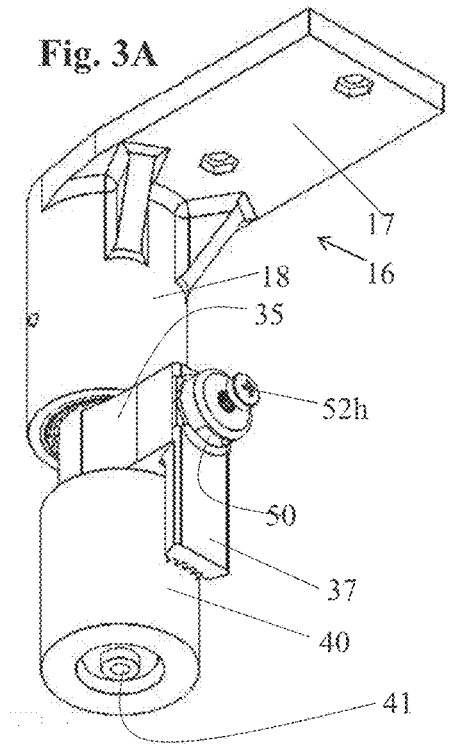
FIG. 3A illustrates a gripper finger according to an embodiment of the present invention.

FIG. 3A shows a preferred embodiment of one finger 10 of the gripping system 1. For obtaining a better understanding of the present invention, the finger 10 and corresponding arm 5 will be explained as follows. For a single finger 10 the proximal direction is the horizontal moving direction when closing on an object to be grasped, i.e. the direction towards the central common point 6. The distal direction is opposite to the proximal direction, i.e. towards the outward edge of arm 5.

Finger 10 comprises a base element 16 configured to connect to the corresponding arm 5 and travel along it proximally and distally. The movement of base element 16 along arm 5 may be according to several mechanisms, e.g. according to a rack and pinion mechanism, a cable driven system, pneumatic/hydraulic cylinders etc. In FIG. 1, a lead screw/follower system is used to translate the base element 16.

The base element 16 is configured to connect to a mobile member 3 (movable thereon) driven along arm 5 by a motor. The gripper system comprises a control unit (e.g. controller) coupled to the motor, that controls the gripping function. Optionally the controlling can be carried out manually by an operator which can input commands to activate the motor to drive the fingers along the arms 5, to change the fingers from frictional to frictionless upon reaching an immobilizing position of an object and to finalize the grasp and maneuver the object. Alternatively, the controlling can be carried out automatically by the controller pre-programmed by the operator with optional use of sensors to determine the steps of the grasping.

According to a preferred embodiment, the fingers are retracted by a lead screw and follower mechanism (shown in FIGS. 1-2) where the follower 2 is part of the mobile member 3 (to which the base 16 of the finger is connected) and the screw 7 is rotated by a motor. The lead screws 7 are powered by a single motor with a torque sensor and an angular velocity sensor, both coupled to the control unit. The sensed torque can be used by the control unit to determine the force applied to each of the fingers. The sensed angular velocity can be used to determine the linear velocity of each of the fingers. While retracting the fingers (closing on an object), a minimal force is required to overcome the natural friction and other energy losses of the system, and therefore a minimal torque is sensed. When a finger impacts the body and transfers kinetic energy to it, the sensed torque rises somewhat (as a function of the transferred energy and motor speed). When the fingers reach an immobilizing grasp (after optimal reorientation of the object), the motor speed is naturally reduced to zero, and the torque rises drastically, until it reaches some user defined maximum. This torque maximum translates to the maximal force applied by the fingers to the object. The state of the gripper and the finger forces can therefore be derived by sensing the torque and speed of the driving motor. In addition, micro-switches or other contact sensors can be used to sense the enactment of the braking mechanism, giving the control unit further information regarding the state of the system. The control unit can control the gripping according to the sensed information according to preprogrammed operating instructions. Ideally, manipulation of the object by the gripper occurs when the braking of all of the fingers is carried out, and when the desired force is applied to each of the fingers (which may be greater than the force required to enact the braking mechanism, as defined by the user).

Figure 3B:
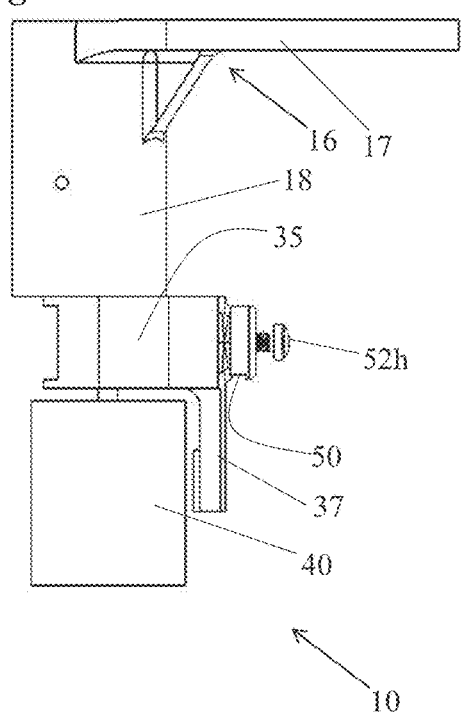
FIG. 3B illustrates a side view of a gripper finger according to an embodiment of the present invention.

FIG. 3B illustrates a side view of a gripper finger according to an embodiment of the present invention.

Figure 3C:
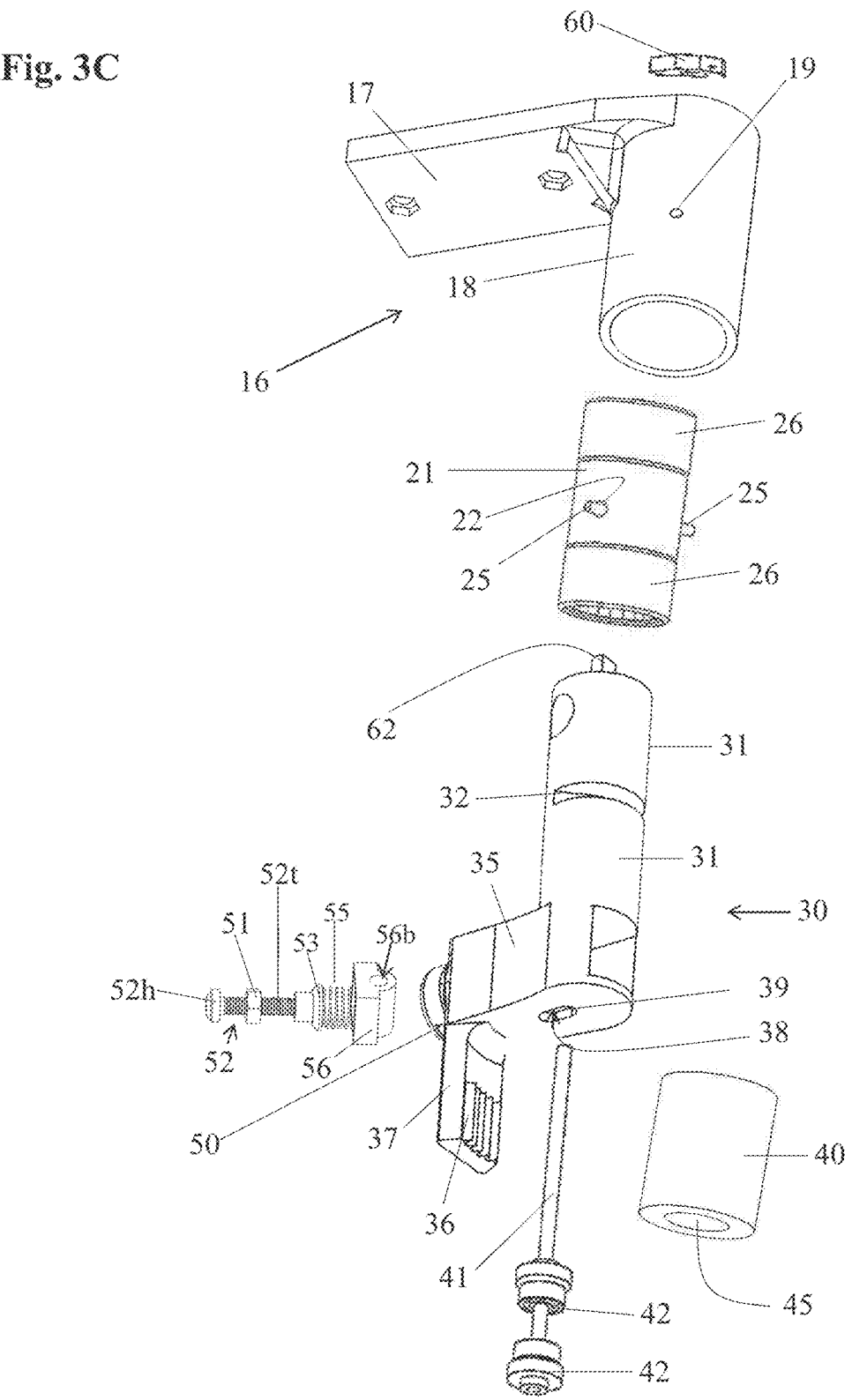
FIG. 3C illustrates elements of the gripper finger according to an embodiment of the present invention.

FIG. 3C shows the main elements of finger 10 disconnected and apart from each other for a better understanding of the invention. The distal portion of base element 16 comprises a flat portion 17. The proximal end of base element 16 comprises a hollow tube 18 extending vertically downwards therefrom. Hollow tube 18 comprises two apertures 19 (only one shown) configured to receive a thin rod as will be explained hereinafter.

Finger 10 comprises a rotator element 30. The rotator element 30 comprises an upper vertical cylindrical portion comprising a horizontal partial slot 32. The upper cylindrical portion 31 is inserted and fitted within tube 18 and rotatable therewithin.

Optionally, needle bearings 26 are inserted within tube 18 with a hollow cylindrical spacer 21 therebetween and cylindrical portion 31 is inserted within them (having a corresponding size). The needle bearings 26 reduce the friction of the rotation of cylindrical portion 31 therewithin. In this case spacer 21 also comprises two apertures 22 (only one shown) configured to receive a thin rod 25 passing through the apertures 22 (its final connection will be explained hereinafter).

Optionally, tube 18 may have needle bearings to assist cylindrical portion 31 rotation. The cylindrical portion 31 in this case has a corresponding size to tube 18.

The upper cylindrical portion 31 is inserted within spacer 21 such that apertures 22 are aligned with apertures 19 and thin rod 25 is inserted therethrough and within slot 32 (in case without the needle bearings and spacer the rod 25 is inserted through apertures 19 only, mutatis mutandis). Thus the rotation of rotator element 30 is limited according to the slot 32 structure such that the rotation may be stopped by rod 25 at both rotation directions. Thus the rotator is rotatable around the central axis of cylindrical portion 31 about a limited angle. This angle limitation can be set to any value (0 degrees to endless turns). In the device depicted in FIG. 1 the angle is limited to 90 degrees, or ±45 degrees from the central position (wherein the rod 25 is perpendicular to the proximal-distal direction). The angle limitation is designed to ensure that the locking mechanism (stopper 37 explained hereinafter) does not contact the grasped body during finger retraction. The upper part of slot 32 rests on rod 25 maintaining rotator element 30 in place vertically.

The rotator element 30 further comprises an elongated hollow portion 35 attached to the bottom of cylindrical portion 31 and extending distally therefrom in a horizontal manner. The elongated hollow portion 35 indeed extends distally being parallel to the flat portion 17 but since the rotator element 30 is rotatable, it can be positioned at an angle from the direction of flat portion 17 such that the center of the rotatable angle is when parallel to flat portion 17. In any case the general direction/position that elongated hollow portion 35 extends to is distally with a possible side deviation (due to the rotation). Other elements attached thereto will also be defined herein as having a general distal orientation with possible side deviations.

The rotator element 30 further comprises a stopper element extending vertically downwards from the distal end of elongated hollow portion 35. The stopper element 37 comprises protrusions 36 on its proximal side configured to stop the roller 40 upon contact therewith (and/or prevent it from spinning), as will be explained hereinafter.

The finger 10 further comprises the roller 40 mounted on a lower portion of a vertical rod 41. The roller 40 comprises a central bore where the rod 41 is inserted therethrough. The roller 40 is rotatable around the rod which is at its central axis. Two mountable bearings 42 are mounted and attached to the rod 41, holding and keeping the roller 40 in place while allowing rotation with minimal friction. The top and bottom surfaces of the roller 40 may comprise recesses 45 and the bearings 42 may be placed within the recesses 45.

Figure 3D:
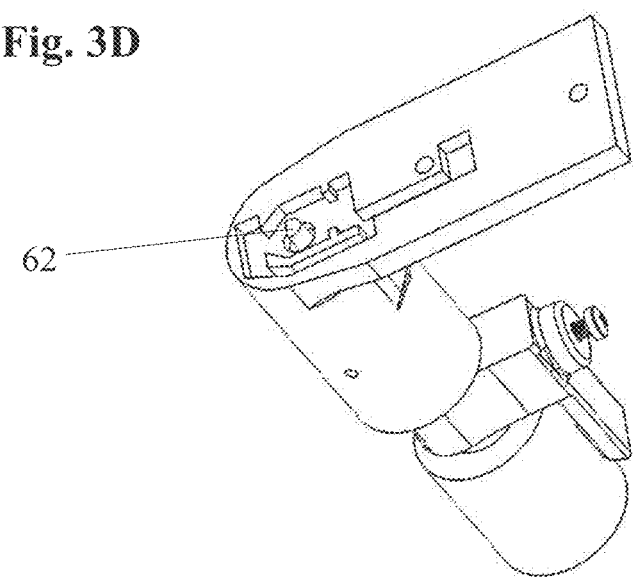
FIG. 3D illustrates another angle view of the gripper finger according to an embodiment of the present invention.
Figure 3E:
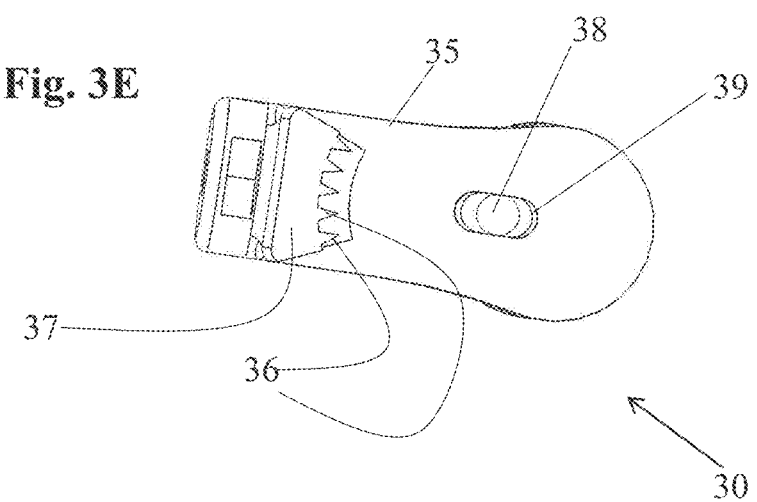
FIG. 3E illustrates a bottom view of the rotator element according to an embodiment of the present invention.

The rotator element 30 comprises a central bore 38 extending vertically upwards from a proximal portion of elongated hollow portion 35 ending at a portion within cylindrical portion 31. Typically, the bottom of the proximal portion of elongated hollow portion 35 comprises an aperture 39 parallel to the bore 38 (with the hollow part therebetween). The bore 38 and aperture 39 have an elongated length portion (along the proximal-distal axis) such that the rod 41 can be positioned vertically with an option to be deviated distally such that the roller 40 can engage the protrusions 36 of stopper element 37. Thus the bore 38 (and aperture 39) may have an elongated circle cross section with the major axis in the proximal-distal direction. A top view of rotator 30 can be seen in FIG. 3E showing bore 38 and aperture 39. The rod 41 does not normally move within the bore 38 due to force applied by a compressed spring 55 through a pushing surface 56 that pushes the rod 41 against one side of the bore 38. Movement of the rod 41 within bore 38 is only possible when an opposing force overcomes the force of the compressed spring 55, as in the case of the activation of the braking mechanism that will be explained hereinafter.

According to this embodiment the stopping of the rotation/spinning of roller 40, i.e. its "braking", is implemented by using a spring mechanism. The roller rotation stopping is carried out when a force threshold is exceeded. When the fingers 10 close on an object by moving proximally (each finger 10 along its corresponding arm 5 towards the connecting center point 6) and when engaging the object, the object orientates itself to an optimal grasp position and then ceases to orientate itself. Then the rollers are therefore placed at the most optimal engaging points of the object. Then, the continuation of the application of force by the fingers 10 proximally causes a normal force from the object surface to the rollers 40 according to Newton's third law of motion.

Figure 4:
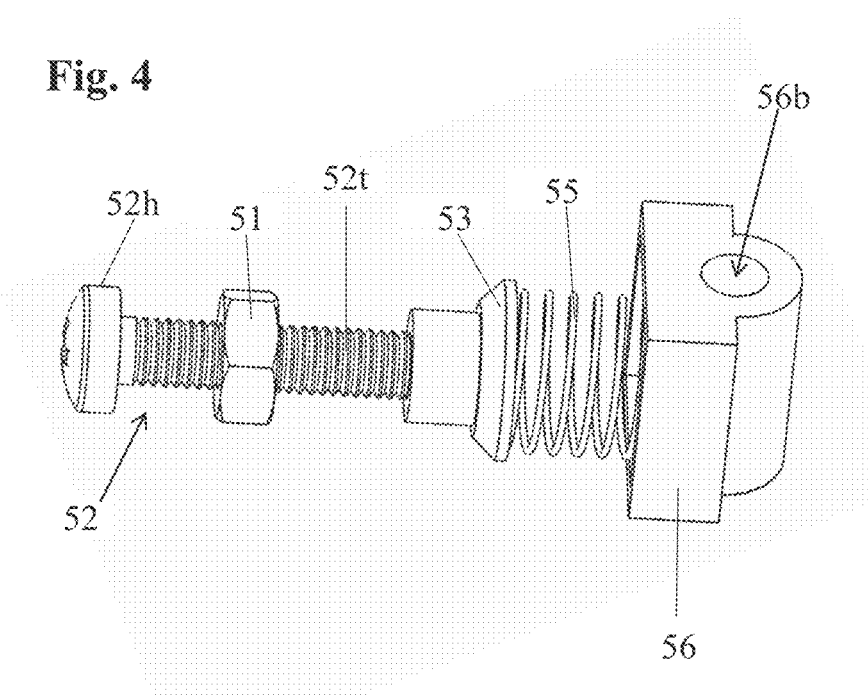
FIG. 4 illustrates a spring mechanism according to an embodiment of the present invention.

The roller 40 is connected to the finger 10 in the following manner. As said, rod 41 is inserted in bore 38. A spring mechanism is inserted within elongated hollow portion 35. The spring mechanism includes a slot 50 (shown in FIG. 3A) at the distal end of elongated hollow portion 35. A nut 51 (as shown also enlarged in FIG. 4) is inserted within slot 50, and a corresponding mating bolt 52 is threaded therethrough (the head 52h of the bolt 52 being on the distal side and the shank and thread 52t on the proximal side). The nut 51 having a thickness corresponding to slot 50 thickness, is maintained stationary, while the bolt may be turned and screwed causing proximal and distal motion. The proximal end of the thread 52t engages a pushing surface 53 placed proximally to it and an elastic element (e.g. spring, wherein according to this specific embodiment—coil spring 55) is placed proximally to the pushing surface 53. A second pushing surface 56 is placed proximal to the spring 55. The pushing surface 56 comprises an inner vertical bore 56b where the rod 41 is inserted therethrough. Thus the spring mechanism works as will be explained hereinafter.

The finger 10 is constructed such that rod 41 (placed in bore 38) being the central vertical axis of roller 40 (which it spins about) is placed at an offset from the central vertical axis of cylindrical portion 31 of rotator element 30 (i.e. they are not aligned). The offset is shown in a top view in FIG. 5. Since stopper element 37 rotates according to rotator 30 (which it is part of) and since the roller 40 is fixed to cylindrical portion 31 at a slight offset—mechanical conditions are formed where upon contact of the roller with the object surface, torque is created that strives to orient the stopper element 37 in a direction normal to the object pushing side surface (the direction of elongated portion 35 is perpendicular to the object pushing side surface). In other words, the normal force from the object to be grasped pushing side pushes the roller 40 in the normal force direction causing the rod 41 to push the bore 38 (and aperture 39) distal end in the normal force direction. Since the bore 38 (and aperture 39) distal end is in the same direction of the stopper element 37, the stopper element 37 is actually pushed in the normal force direction and thus the stopper element 37 is rotated until it faces the object pushing side orientation (both being perpendicular to the normal force direction).

When the normal force increases (due to the system force applied to finger 10 to move proximally along arm 5 and thus Newton's third law) the roller 40 is pushed such that it deviates in the normal force direction and engages the stopper element 37 which stops its ability to rotate. The protrusions 36 engagement with the roller 40 causes friction with the roller 40 body making it stationary and un-rotatable thus the roller 40 becomes a frictional fingertip that can provide a robust grasp.

At its regular state before being pushed by the normal force, the roller 40 is oriented such that the rod 41 is maintained vertically by the spring mechanism. The pushing surface 56 is pushed proximally by the spring such that rod 41 is maintained in a vertical position. Since the nut 51 is stationary in slot 50, the bolt 52 may be adjusted proximally such that the pushing surface 53 (being pushed by the bolt proximal end) may push the spring 55 distal end causing it to contract and thus increasing the normal force threshold needed to stop the roller rotation. This is because more normal force will be needed to push the roller (and thus the rod 41 to which it is connected and thus the pushing surface 56 to which the rod passes therethrough) to overcome the spring force. Alternatively, the bolt 52 may be adjusted distally such that the pushing surface 53 may retract distally causing the spring 55 to expand (and thus decreasing the normal force threshold needed to stop the roller rotation). This is because less normal force will be needed to push the roller (and thus the rod 41 to which it is connected and thus the pushing surface 56 to which the rod passes therethrough) to overcome the spring force. Thus the force of the pushing surface 56 pushing the rod 41 therewithin may vary according to the spring contraction/expansion length. According to this, a user may determine and adjust the threshold of the normal force that is required to change the fingertip from frictionless to frictional, i.e. that causes the roller to stop rotating. Additional springs of different lengths and stiffness may be added between pushing elements 53 and 56 to increase the threshold normal force range required for "braking" the roller 40. Of course a user can further adjust different force thresholds required to "brake" the rollers by replacing the spring with another that is more stiff or less stiff or by adding or removing additional springs.

Figure 5:
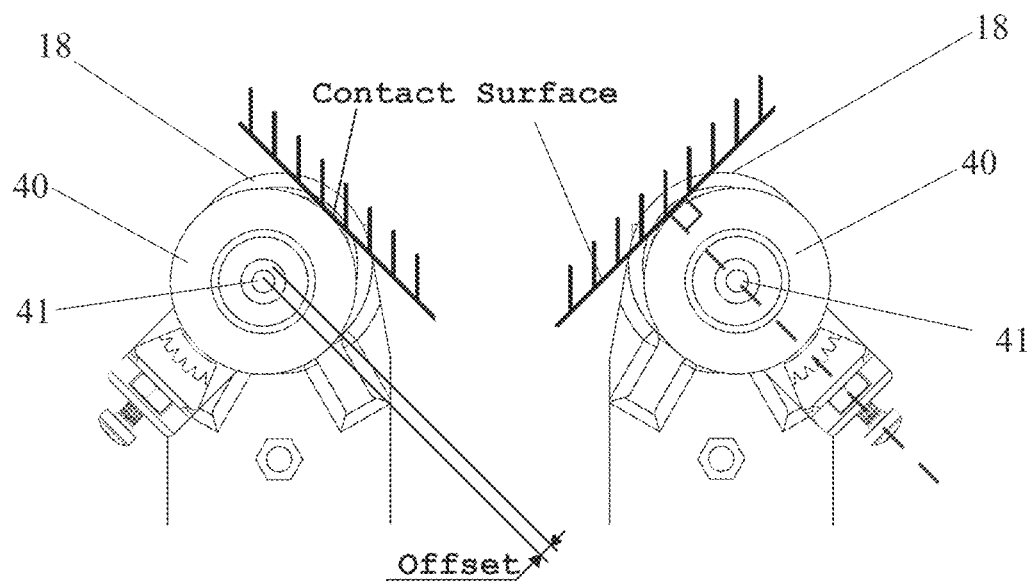
FIG. 5 illustrates a demonstration of the offset according to an embodiment of the present invention.

FIG. 5 shows the roller 40 contacting a surface creating a torque that rotates the stopper element 37. In the left image, the roller 40 contacts a surface in the NW-SE direction. In the right image the roller 40 contacts a surface in the SW-NE direction. In both cases, the stopper element 37 is parallel to the surface (with the normal force perpendicular to both).

Figure 6:
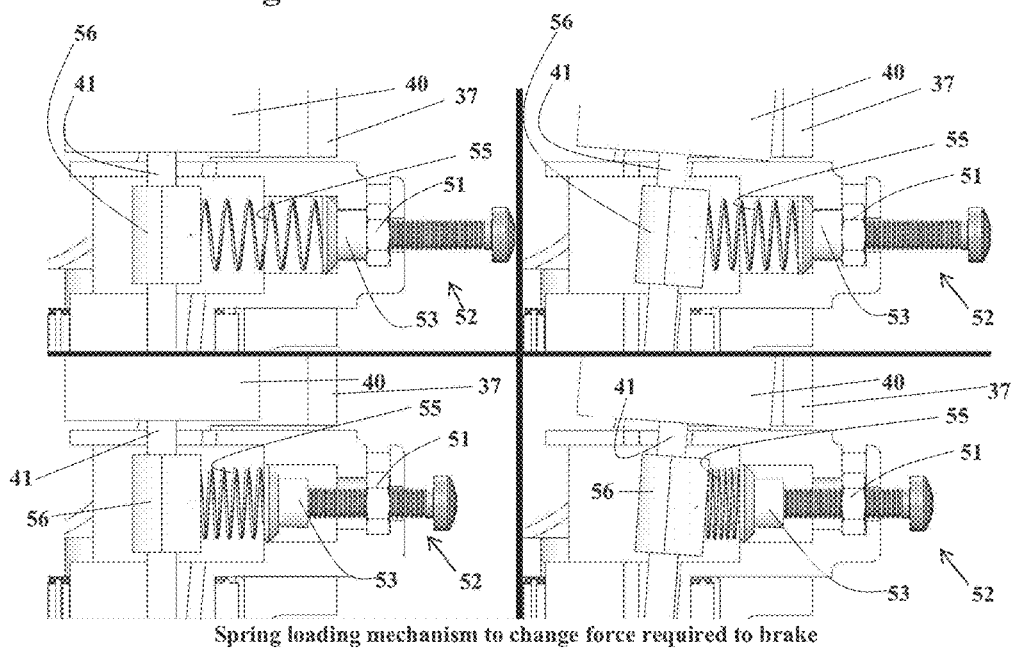
FIG. 6 illustrates a demonstration of the spring mechanism function.

FIG. 6 describes the mechanical compliance that enables the varying threshold force. The top left image shows the roller 40 in a "relaxed" position (the spring 55 is uncompressed or minimally compressed, pushing rod 41). The bottom left image shows the roller 40 after the spring 55 is additionally compressed by the bolt 52. The top right image shows the roller 40 in a breaking position when the spring is relatively in a relaxed position thus a mere small force was needed to cause the braking. The bottom right image shows the roller 40 in a braked position, where enough force was applied to overcome the preloading force caused by the bolt compressing the spring (the compression as in bottom left image).

Orientation sensors such as optical encoders or potentiometers (coupled to the system controller) can be used to determine the relative angle between the rotating stopper element 37 and the distal-proximal direction (e.g. the direction of arm 5). By measuring this relative angle one can derive the surface angle (contact surface orientation) of the object being grasped at the point of contact with the fingertip roller 40 at any stage of gripping. The orientation information can be used to determine the object's pose during finger retraction and upon grasping, in order to estimate grasping progress and detect placement errors. FIG. 3C shows an example of a potentiometer 60 connectable to a protrusion 62 (shown in FIGS. 3C and 3D) extending vertically upwards from the center of the top of cylindrical portion 31 and thus rotates in accordance to the rotation of cylindrical portion 31.

Braking can be detected by means of a physical contact sensor, such as a microswitch or other means of closing an electric circuit by contact between the roller 40 and the stopper element 37. The physical contact sensor is coupled to the system control unit. This detection may assist the system in determining the grasp state. Fingers that are determined as "braked" by means of this sensor are friction contacts, while fingers that are not determined as "braked" are frictionless contacts (enabling the rollers to spin). One embodiment of the contact sensor is a button attached to the proximal side of stopper element 37. When the roller engages stopper element 37 the button is pressed indicating braking to the control unit. Another embodiment includes a metal strip attached around the roller such that when it contacts a corresponding circuit attached to the proximal side of stopper element 37 a circuit is closed and thus indicating braking to the control unit.

Optionally, the system comprises force sensors attached to the stopper element 37 or on the roller 40 (and coupled to the control unit) used to determine the normal force applied by each finger to the object (or the normal force applied to each finger by the object).

Figure 8:
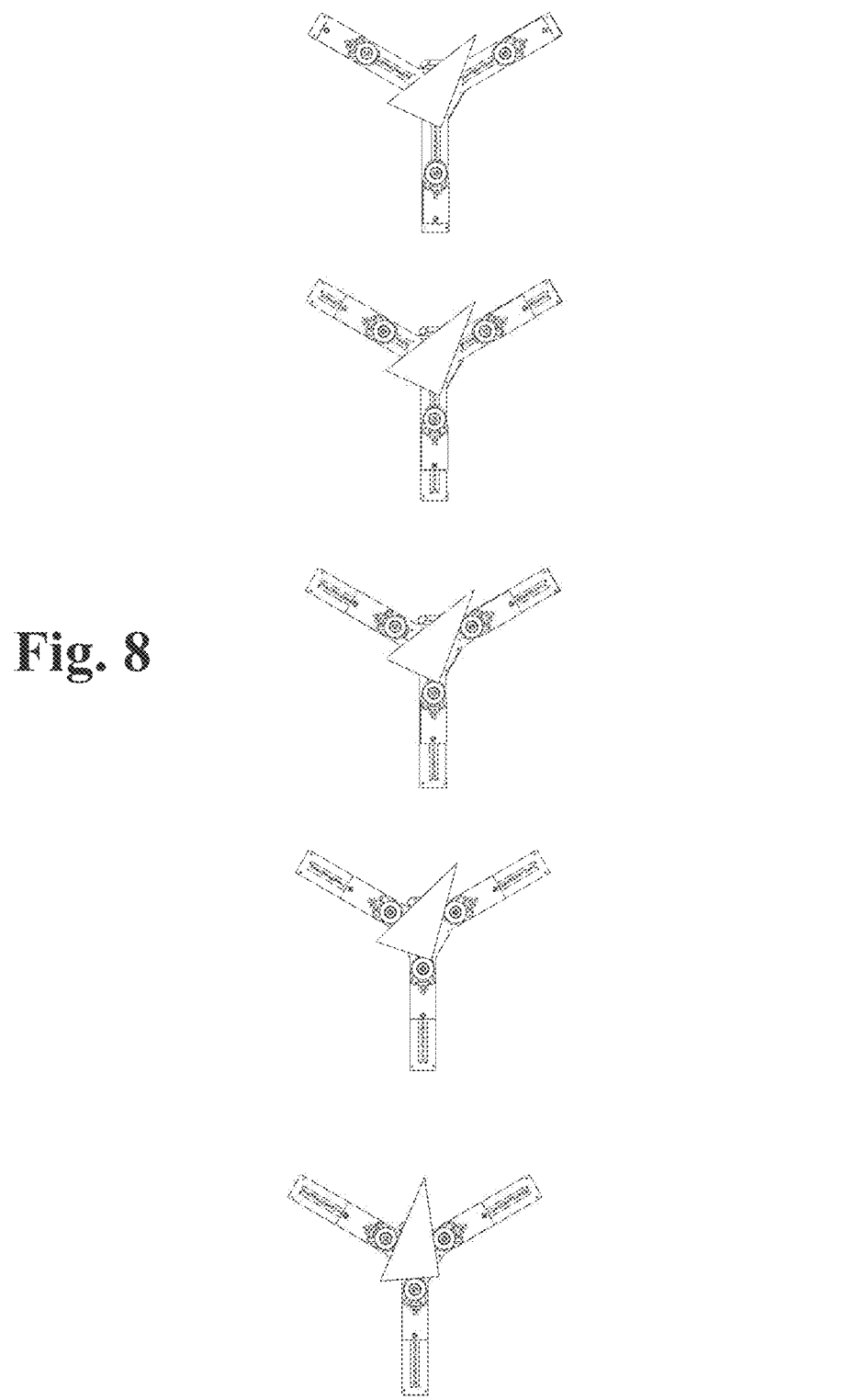
FIG. 8 illustrates a sequence of closure of the gripper fingers on an object and reorientation according to an embodiment of the present invention.

FIG. 8 shows the engagement and orientation of an object by the gripper fingers of the present invention. Five images are shown sequentially from top to bottom, wherein the rollers engage a triangular object and reorient the object to the optimal steady state position for an immobilizing grasp. After reaching the optimal position (bottom image) the fingers become frictional thus obtaining a robust frictional immobilizing grasp.

Figure 7A:
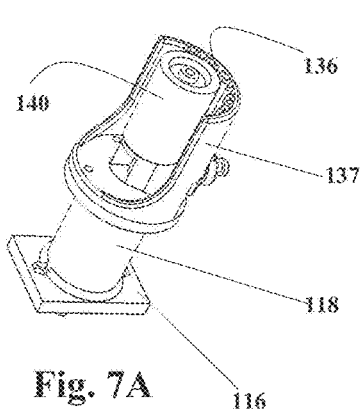
FIG. 7A-7B illustrate the half cup stopper element according to an embodiment of the present invention.
Figure 7B:
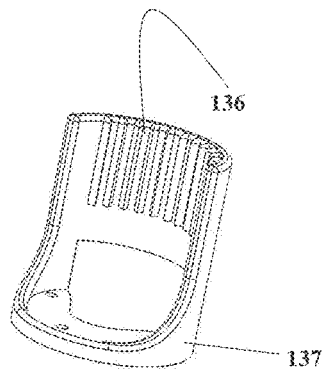

FIG. 7A shows a different embodiment of the present invention. This embodiment does not comprise a rotating stopper, rather a stationary half cup element stopper 137. The roller, the elongated hollow element and spring mechanism may be similar like explained hereinabove. The roller 140 is mounted on a rod passing through the elongated hollow element into an elongated bore (enabling rod deflection), the bore being within an elongated portion 118 (e.g. tube) extending (e.g. vertically) from a base element 116. The half cup element stopper 137 has a half cylindrical shape initially parallel to the roller 140 and its inner side (which is its proximal side) is placed facing the roller 140 distal side. When the rod is deflected due to the normal force of the object on the roller 140, the roller 140 engages the stopper 137 inner (proximal) side and thus ceases to rotate and is stopped. The stopper 137 inner side comprises protrusions 136 that apply friction with the roller 140 causing it to stop and/or prevent it from spinning. FIG. 7B shows the half cup element stopper 137.

The gripper hand may be made mostly of aluminum and plastic (3d printed or laser-cut) preferably with some steel components. The fingers are preferably made mostly of plastic (3d printed), a coating of latex on the rollers, and some steel components.

The base element 16 is preferably between 15 and 75 mm long, more preferably between 25 and 65 mm long, for example between 40 and 50 mm). The base element 16 may comprise plastic, steel, aluminum, etc.

The hollow tube 18 is preferably between 20 and 60 mm long and preferably has an inner diameter between 15 and 25 mm. Its height is preferably between 25 and 55 mm, and its diameter is preferably between 10 and 30 mm). The hollow tube 18 may comprise plastic, steel, aluminum, etc.

Cylindrical portion 31 is preferably between 60 and 95 mm long with an outer diameter of preferably between 10 and 20 mm. Cylindrical portion 31 may comprise plastic, brass, steel, etc.

The bore 38 is preferably between 2 mm and 4 mm in diameter.

The slit is preferably of diameter equal to the bore 38, with an arc preferably between 2 and 6 degrees and a depth of between 25 mm and 45 mm.

The rod 41 should preferably be of equal diameter to the bore 38, with a clearance fit. The rod 41 may comprise steel.

The elongated portion 35 should preferably have a cross section of between 10×7 mm^2 and 20×17 mm^2, with a length of between 20 and 40 mm. The elongated portion 35 may comprise plastic, brass, steel, etc.

The length of springs 55 can vary greatly depending on the users force threshold requirements, however the compressed spring length should preferably not exceed the half the length of the elongated portion 35. The springs 55 may comprise steel.

The pushing elements 53, 56 should preferably have a diameter equal or greater than the diameter of the springs 55, and preferably comprise plastic.

The roller 40 is preferably between 20 mm and 30 mm in diameter, with a preferable height of between 20 mm and 40 mm. The roller 40 preferably comprises plastic, or preferably comprises aluminum coated with rubber or latex.

The stopper 37 should preferably have a height that is between half the height of the roller 40, and the full height of the roller 40. The stopper 37 preferably comprises rubber coated steel, or preferably comprises plastic or rubber coated brass.

Arms 5 should preferably have a length of between 50 mm and 250 mm depending on the required extension. The arms 5 preferably comprise aluminum.

The roller coefficient of friction depends on the object to be grasped. A typical value of the coefficient of friction between rubber and steel (such as the contact between the roller and a steel object) is 0.7. A typical value of a rubber on rubber contact (the roller with the stopping element for example) is 1.15, etc. The higher the coefficients of friction is, the better. A good value would be anything above 0.5 (ballpark estimate).

The offset distance between the central axis of the roller and the rotation axis of the elongated portion is preferably between 1 and 5 mm. The larger the offset is the moments created to align the stopper with the object to be gripped (one facing and parallel to the other) are greater.

The present invention relates to a method for grasping and displacing an object using the system as explained herein.

The present invention relates to a method for grasping and displacing an object comprising:
engaging said object with a plurality of movable fingers;
optimizing the grip with a substantially frictionless engagement;
immobilizing said object by adjusting frictional properties of said fingers.

The adjusting frictional properties may be carried out by increasing friction.

The adjusting frictional properties may comprise stopping the rotation of a roller (as explained herein).

Preferably, the stopping of the rotation of a roller is by deflecting the roller central axis and/or engaging said roller with a stopper.

According to another aspect of the present invention, the conversion between frictionless and frictional fingertips is obtained by using a mechanism that locks and immobilizes a spherical element at the fingertips. According to this aspect of the present invention the fingers comprise a sphere shaped element at the fingertips. The sphere shaped element (also referred to as "spherical element" or "ball" interchangeably) is maintained within a receiving element with a portion projecting out of the receiving element engageable with the object to be grasped.

At a first stage, the sphere shaped element is frictionless and freely rotatable in any direction (in a similar manner as the ball of a mechanical computer mouse). When forces are applied by a plurality of arms (each arm comprising one of said types of fingers) to an object to be grasped, the spherical element in each finger engages the object and frictional forces do not occur therebetween, but rather the object may be movable along the rotation of the spherical element in accordance with the forces applied by the plurality of arms to the object. At a second stage, the spherical elements of the fingers are "braked" and immobilized thus effectively changing the frictionless fingertips into frictional fingertips.

The "braking" may be applied actively using standard braking mechanisms or specialized braking mechanisms, based on predetermined time, location or other gripping based parameters that trigger the braking mechanism. Alternatively, braking may be applied through finger-object interaction, i.e. based on forces applied to the fingertips with an internal mechanism that triggers the brakes when the force exceeds a predetermined threshold. Such a force would be applied when retraction/closure is completed and the object in an optimal position/orientation to be grasped. Then the fingertips in an immobilizing grasp position become frictional.

According to this aspect of the present invention, due to the spherical elements being rotatable in any direction the robotic fingers contact the object being grasped and manipulate it (reorient the object being grasped) within the spatial range and not only change its position on the same plane (as in the embodiment of the example of FIG. 8). That is, the normal force vectors formed during contact between the fingers and the object being grasped are not limited to a single plane. Furthermore, the arms (comprising the fingers) may engage the object from several locations in the spatial range. The object may reorient along the spherical elements rotation and thus the fingertips may eventually engage the object at any point on its outer surface.

This aspect of the present invention enables improved gripping of objects in relation to just-frictionless or just-frictional fingertips. Due to the change between stages of the fingertips the advantages of both frictionless and frictional fingertips are obtained along with a full 3-D reorientation ability in the spatial range (to a most optimal orientation), thus providing a robust gripper. The present invention fingers may be integrated within existing gripping systems.

According to this aspect of the present invention, the present invention comprises a gripping system with one or more arms engageable with an object to be grasped. The arms comprise fingers attached thereto engageable with the object being grasped. The arms may be manipulated towards the object in many manners/variations. According to a particularly efficient embodiment of the present invention, the system comprises four arms each arm comprising a finger, such that the four fingers are positioned in a manner that they form a regular tetrahedron (the fingers being the four tetrahedron vertex corners). The fingers thus engage the object to be grasped from a position such that (preferably all of or most of) said object is within the tetrahedron interior (throughout the object engaging procedure), and the fingers close in on it, with the spherical elements of the fingertips facing the object to engage it and subsequently grip it. Other embodiments of different robotic hands may use the fingers in different grasp configurations.

Figure 9:
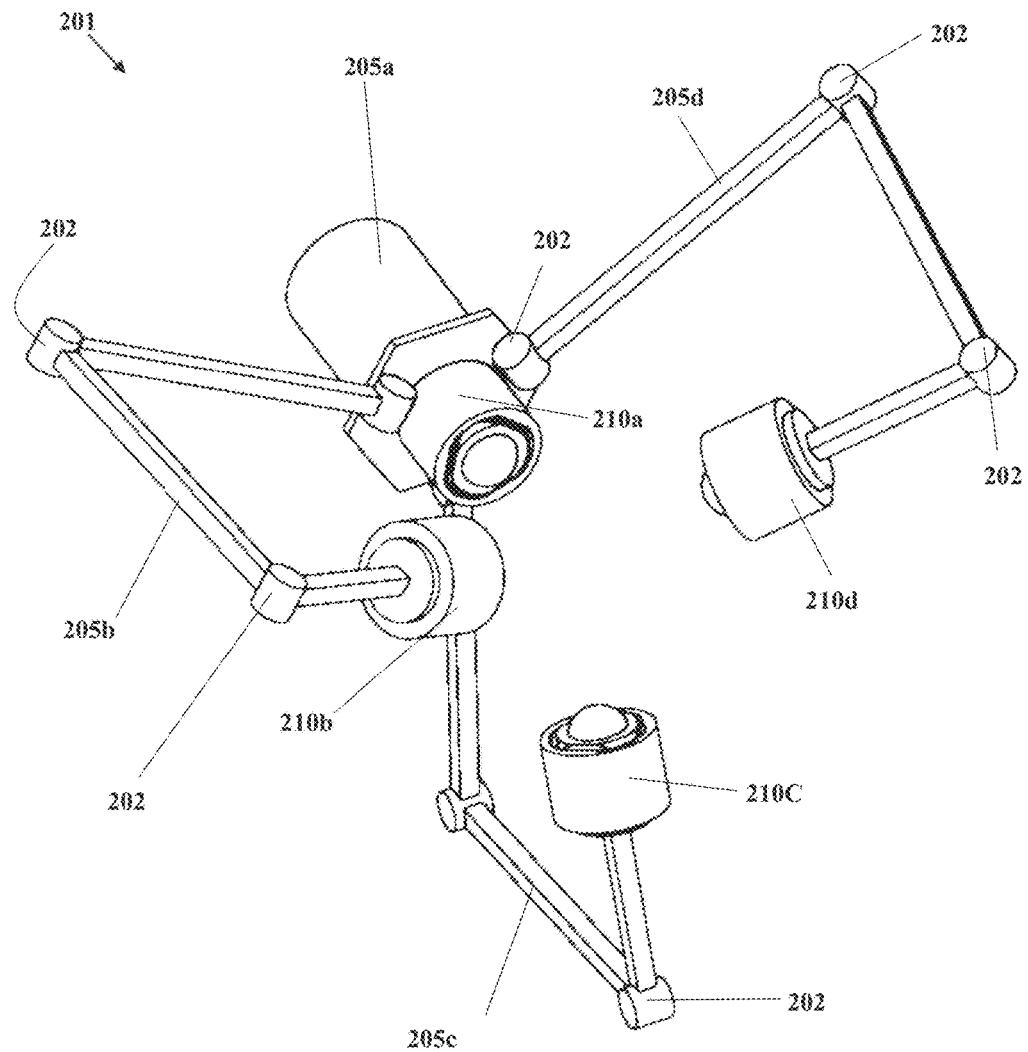
FIG. 9 illustrates a system according to an embodiment of the present invention.

FIG. 9 illustrates an embodiment of the present invention comprising a gripping system 201 with four fingers 210a, 210b, 210c and 210d. For obtaining a better understanding of the present aspect of the invention and in accordance with the previous aspect, the fingers and corresponding arms will be explained as follows. For a single finger 210 and corresponding arm, the proximal direction is the moving direction when closing in on an object to be grasped, i.e. the direction towards the object to be grasped. The distal direction is opposite to the proximal direction, i.e. away from the object to be grasped.

In the present invention four arms may engage the object to be grasped independently from four directions in the spatial range. The embodiment of FIG. 9 shows a central arm 205a connected at its distal end to a robotic maneuvering system (not shown) capable of maneuvering it.

The central arm 205a comprises a finger 210a attached to its proximal end (and extending proximally therefrom). The system 201 comprises three additional arms 205b, 205c, 205d, attached to the proximal end of central arm 205a and extend proximally therefrom. Each arm 205b, 205c 205d comprises a corresponding finger 210b, 210c, 210d (respectively) attached to its proximal end extending proximally therefrom.

The arms of the system may be maneuvered in several manners to engage and grasp an object. In the embodiment of FIG. 9 the arms 205b, 205c and 205d each comprise three revolute joints 202 along their lengths. Each revolute joint 202 enables rotation of a portion of its arm that is proximal thereto (of course said proximal portions being connected to the revolute joints 202). Thus the arms 205b, 205c, 205d may engage the object to be grasped from several directions/ positions. Particularly, in the tetrahedron configuration, the revolute joints allow the fingers to remain at the vertices of the tetrahedron, while the fingers point towards the center of the tetrahedron.

When the fingers 210 engage the object to be grasped, the fingers 210 fingertip spherical elements rotate upon pressures applied on them. Optionally, in this implementation of the robotic hand system, three links driven by revolute motors are used to determine the location and orientation of each finger 210. The joints are position controlled so that the fingers always lie on the tetrahedron vertices, and always point towards the tetrahedron center. This virtual tetrahedron can be enlarged or reduced freely while maintaining the same finger location and orientation rules.

When engaging the object the fingers apply pressure to the object. The spherical elements rotate such that the object adjusts its position/orientation until it reaches a steady state. This steady state is that in which no more energy is transferred to the object by the fingers, and they are both stationary (in an immobilizing grasp). Then, force may be applied from the enclosing fingers causing a reactive normal force from the object external surface engaging the spherical elements, pushing them back (distally). This pushing of the spherical elements causes the triggering of the spherical elements braking mechanism (ball stopper) after the normal force of the pushing of the spherical elements exceed a certain force threshold. Then the spherical elements cannot rotate and act as efficient frictional fingertips providing an efficient robust grasp. In other words, at the first stage the force from the arms and the freely rotatability of the sphere elements cause reorientation of the object (and possibly moving of the object). At a second stage, after reaching the optimal steady state orientation position (i.e. once no more finger re-orientation or object movement are possible), the force is used to brake the fingers. Accordingly, the normal forces from the object to the spherical elements increase and are used to brake the fingers. When the normal forces applied on the spherical elements increase beyond a certain threshold, the braking mechanism is triggered and the spherical elements are immobilized, thus obtaining frictional fingertips. The gripper system comprises a control unit (e.g. controller) coupled to the revolute joints 202 interior motors (or central single motor) that controls the gripping function. Optionally the controlling can be carried out manually by an operator which can input commands to activate the motors of the revolute joints 202 to maneuver the fingers, to change the fingers from frictional to frictionless upon reaching an immobilizing position of an object and to finalize the grasp and maneuver the object. Alternatively, the controlling can be carried out automatically by the controller pre-programed by the operator with optional use of sensors to determine the steps of the grasping.

The angular joints are powered by separate rotational motors, or a single motor with timing mechanisms (gears, belts, etc.) at the joints so that the relative distances between the fingers is equal (but not necessarily constant), and the finger orientation is constant, so that all of the fingers are directed to a single point in the center of the tetrahedron created by the four fingers (i.e. the relative distances between the fingers is relatively maintained). The motor or motors that power the robotic hand have torque and angular velocity sensors that are coupled to the control unit. The sensed torque can be used by the control unit to estimate the force applied to each of the fingers. The sensed angular velocity can be used to determine the linear velocity of each of the fingers. While retracting the fingers (closing in on an object), a minimal force is required to overcome the natural friction and other energy losses of the system, and therefore a minimal torque is sensed. When a finger impacts the body and transfers kinetic energy to it, the sensed torque rises somewhat (as a function of the transferred energy and motor speed). When the fingers reach an immobilizing grasp (after optimal reorientation of the object), the motor speed is naturally reduced to zero, and the torque rises drastically, until it reaches some user defined maximum. This torque maximum translates to the maximal force applied by the fingers to the object. The state of the gripper and the finger forces can therefore be derived by sensing the torque and speed of the driving motor or motors. In addition, microswitches or other contact sensors can be used to sense the enactment of the braking mechanism, giving the control unit further information regarding the state of the system. Optical sensors can be used in each finger to measure rolling of the ball, thus measuring the path travelled along an object. For example, an optic device (similar to a camera) is placed inside the encasing element (of either implementation). This camera sees the rolling of the ball relative to the encasing element, exactly like a trackball. The movement of the ball provides information on the distance rolled on the object.

The control unit can control the gripping according to the sensed information (which all sensors explained herein may be coupled thereto) according to preprogrammed operating instructions. Ideally, manipulation of the object by the gripper occurs when the braking of all of the fingers is carried out, and when the desired force is applied to each of the fingers (which may be greater than the force required to enact the braking mechanism, as defined by the user).

Figure 10A:
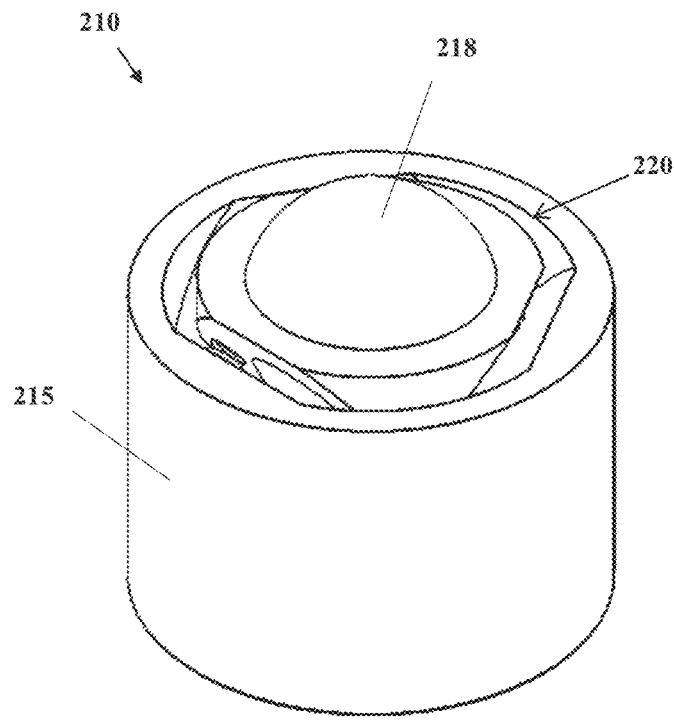
FIGS. 10A-10B illustrate a gripper finger according to an embodiment of the present invention.

FIG. 10A illustrates an embodiment of a finger 210 of the present invention. Finger 210 comprises an external hollow receiving cup 215 with an opening at its proximal side. Preferably the receiving cup 215 is cylindrical. Finger 210 comprises a ball 218 and a ball encasing element 220 wherein said ball 218 is encased therewithin.

The interior of the receiving cup 215 comprises a plurality of internal surfaces. Preferably, there are three surfaces that each one of them is orthogonal to the other two surfaces.

Figure 10B:
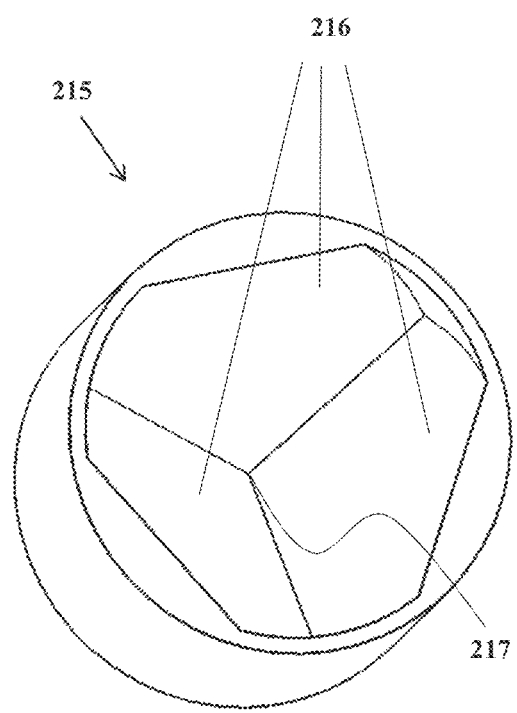

FIG. 10B shows three surfaces 216 in the form of three triangular faces meeting at a common vertex corner 217 placed distally to said three surfaces 216. Preferably, each of the three triangular faces is orthogonal to the other two triangular faces (i.e. like a corner of a cube).

FIGS. 11A-11D show different angles of an embodiment of the ball encasing element 220. The ball encasing element 220 comprises distal surfaces corresponding in shape to the receiving cup 215 internal surfaces (as explained herein). Preferably, the ball encasing element 220 comprises three distal surfaces 226 in the form of three orthogonal triangular faces meeting at a common vertex corner 227 placed distally to said three surfaces 226. The interior surface 224 of the encasing element 220 is round and in the form of the majority of an outer surface of a ball. In other words the interior surface 224 of encasing element 220 comprises a distal ball apex that widens proximally in the shape of a ball until the maximum ball circumference ($2\pi r$, r being the ball radius) and then decreases (in the shape of the continuation of the ball), and terminates at round circular opening 221 at the proximal end of encasing element 220. The circular opening 221 comprises a circular shape with a circumference smaller than $2\pi r$ such that ball 218 may be encased therewithin. Part of ball 218 is proximal beyond opening 221.

Figure 11A:
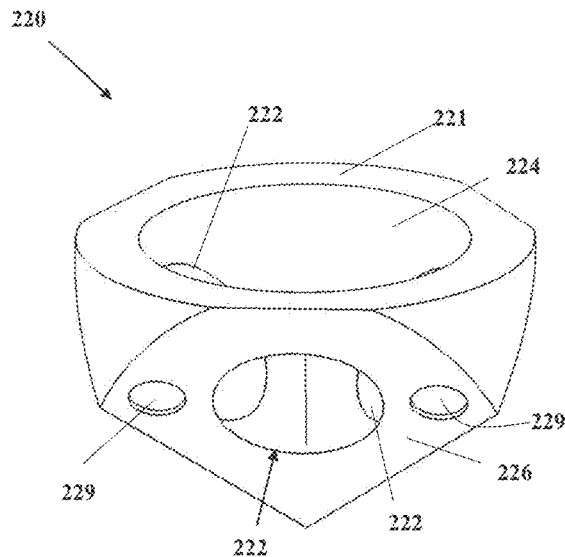
FIGS. 11A-11G illustrate a ball incasing element according to an embodiment of the present invention.
Figure 11B:
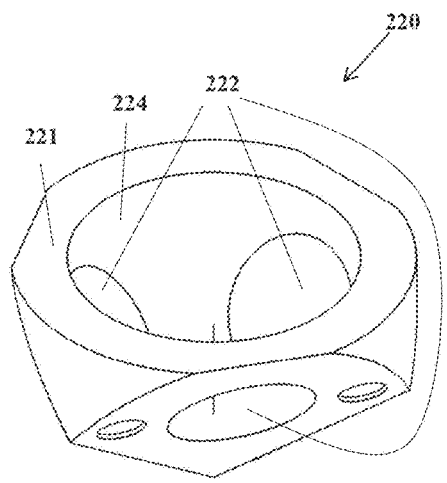
Figure 11C:
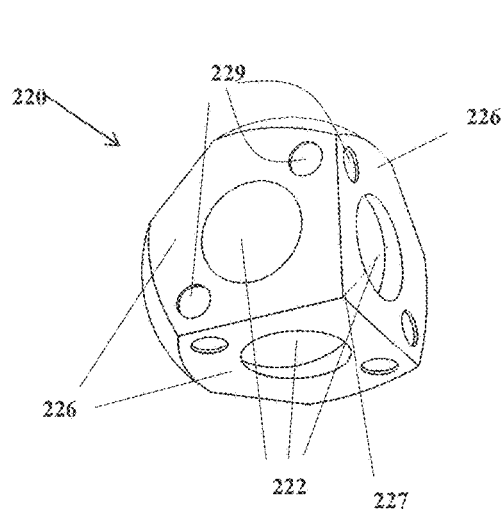
Figure 11D:
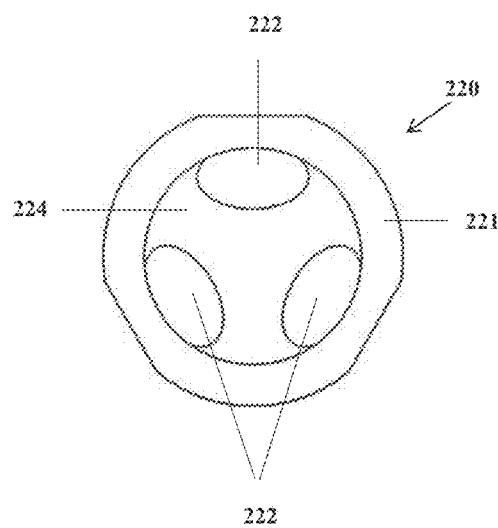

Encasing element 220 comprises an aperture 222 on each of the distal surfaces 226 (each aperture 222 being on its corresponding surface 226 on its outer side and at a corresponding location on surface 224 on its inner side). The apertures 222 enables a portion of ball 218 cased within the inner side of encasing element 220 to protrude outwards beyond its corresponding surface 226 (e.g. shown well in FIG. 11E). Typically, the ball 218 radius is slightly smaller than the ball radius of surface 224 so as to enable the ball 218 to be freely rotatable in any direction (with minimal friction). FIG. 11C shows a bottom view (the distal side) of encasing element 220. FIG. 11D shows a top view (the proximal side) of encasing element 220.

Figure 11E:
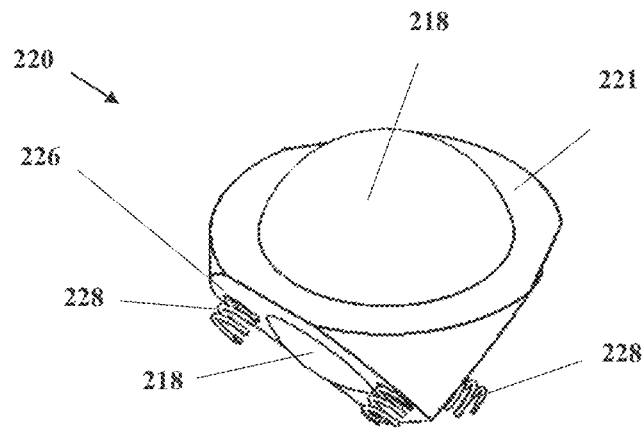
Figure 11F:
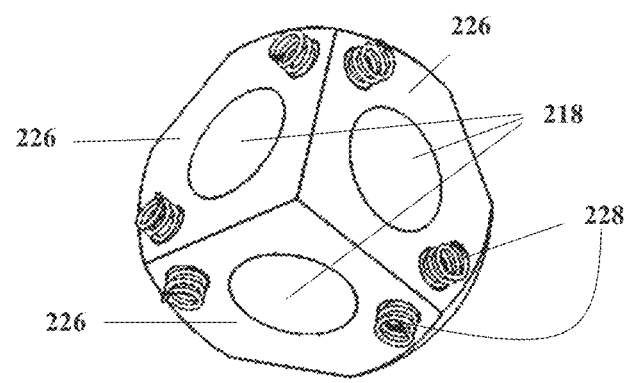
Figure 11G:
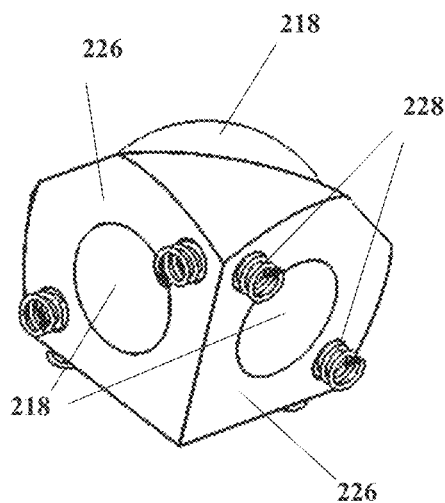

FIGS. 11E-11F show different angles of the ball encasing element 220 with ball 218 encased thereinside.

The ball encasing element 220 with ball 218 encased thereinside is placed within the interior of receiving cup 215 such that each surface 226 faces a corresponding surface 216. At least one elastic element (e.g. spring) 228 is placed between each surface 216 and its corresponding surface 226. As the distal sides of fingers 210 are attached to the proximal sides of arms 205, when engaging the object to be grasped and applying force thereon the object reorients to its steady state as the balls 218 rotate and the encasing element 220 is displaced according to the force directions applied. The contact forces constantly move the object to new equilibrium points as the fingers contract, until no further object movement or orientation is possible. At this point, the fingertip balls 218 are engaging points of the object that result in a stable equilibrium grasp. When the steady state is reached where normal force is applied to the balls 218, the normal force displaces the encasing element 220 corresponding to Hooke's law on the elastic elements 228. The force applied to the ball during the finger retraction is lower than that required to displace the encasing element 220 beyond a pre-determined "braking distance". Once the retraction is concluded, further force is applied which displaces the encasing element 220 beyond the "braking distance", at which point the ball contacts one of the orthogonal surfaces (corresponding to the force direction) and is braked by the friction with it. At this point the portion of ball 218 protruding the corresponding aperture 222 of the surface 226 (touching the contracted elastic element 228) engages the corresponding surface 216. The ball 218 and the surfaces 216 are constructed such that there is (typically high) friction upon their engagement. The normal force applied and the friction between the protruding portion of the ball 218 and the surface 216 that it engages causes the ball to be immobilized and thus frictional. Thus the proximal portion of ball 218 that engages the object to be grasped is immobilized and a frictional grasp is obtained. After the system arms 205 release the grasped object the normal force ceases and thus the elastic force (e.g. spring force in case of springs) of the contracted elastic element 228 causes elastic element 228 to expand to its regular length pushing the corresponding surface 226 away from its corresponding surface 216 and thus ball 218 ceases to engage surface 216. Accordingly ball 218 becomes once again freely rotatable in any direction, and the finger 210 becomes frictionless.

The orthogonal spring mechanism works according to a principal wherein orthogonal springs (228) are displaced linearly according to their respective force components. The sum of displacements is linear to the total force and not affected by the direction.

According to an embodiment of the present invention each surface 226 comprises two recesses 229 at both the sides of aperture 222 with a certain separating gap (of the surface) being therebetween. Two elastic elements 228 are placed between each surface 226 and corresponding surface 216. Preferably each elastic element 228 extends from within corresponding recesses 229 to the corresponding facing surface 216.

Typically, the surfaces 226 are smaller than their corresponding surfaces 216 so that encasing element 220 may be placed within receiving cup 215 with enough room to translate and tilt. Typically each surface 226 is translatable towards its corresponding surface 216. This embodiment has been explained with respect to an orthogonal shape of 3 surfaces with respect to surfaces 216 and 226. It should be noted that other shapes comprising surfaces or other numbers of surfaces (e.g. 4 surfaces, 5 surfaces, or more) within the receiving cup may be used with corresponding shapes/surfaces in the encasing element 220. Typically, surfaces 216 and 226 are flat. The elastic elements 228 may be attached at both ends to their corresponding surfaces (226 and 216), so that the encasing element 220 will remain within receiving cup 215 and will not "fall out". Alternatively, an additional "lip" (not shown) may be added to the inner side of the cup proximal circumference, so that the encasing element 220 could not move proximally out of the cup.

According to an embodiment of the present invention, the surfaces 216 are concave spherical surfaces, such that they share a center point with each other and with the ball 218 at a resting position. The difference between the radius of the ball and the radius of the spherical surface is essentially the distance between the ball and the surface at any point. This means that when the ball is displaced by this radius-difference, the ball will contact one of the spherical surfaces at some point, braking the ball. This configuration guarantees that the direction of the force, which directly affects the direction of displacement, has little to no effect on the required braking force magnitude.

Figure 12A:
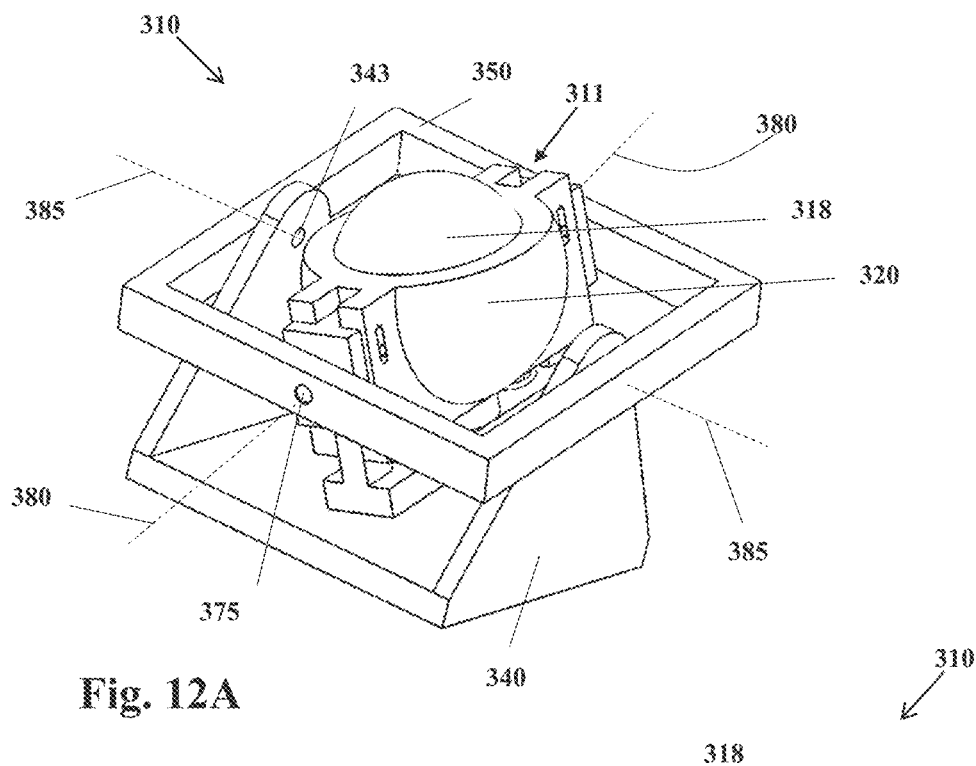
FIGS. 12A-12C illustrate a gimbal gyroscopic finger according to an embodiment of the present invention.
Figure 12B:
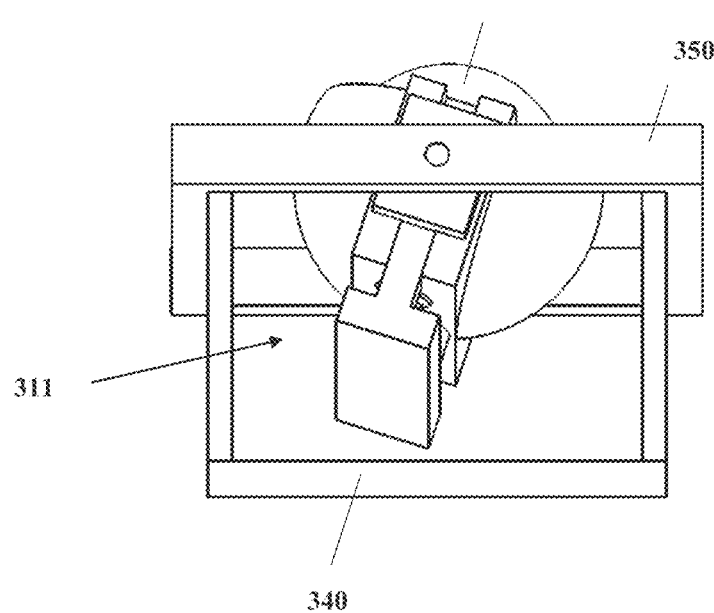
Figure 12C:
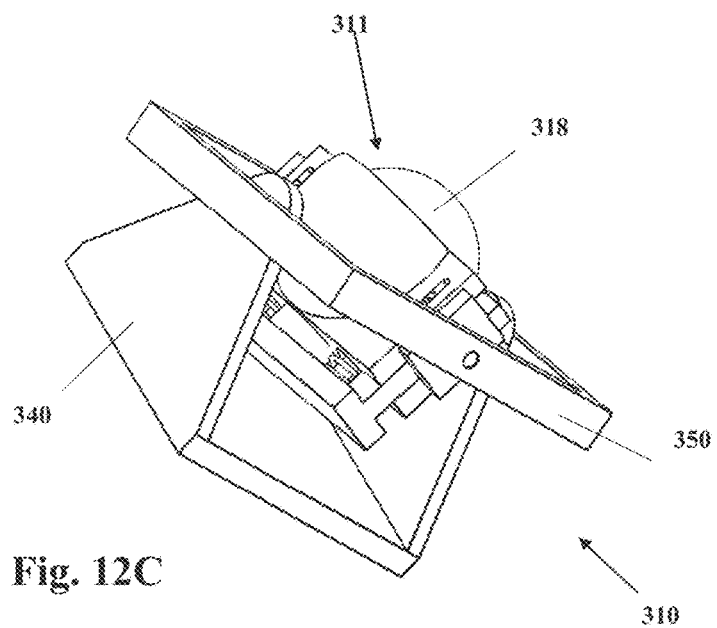

According to another embodiment of the present invention the fingers comprise spherical fingertips with a gimbal gyroscopic mechanism. FIG. 12A-12C illustrates an embodiment of a finger 310 of the present invention. The finger 310 comprises a ball 318 protruding at the finger 310 distal end. The finger 310 comprises three main parts—a distal base 340, a circumferential ring 350 and a braking unit 311 (part of which is substantially movable in the distal-proximal direction).

Figure 13:
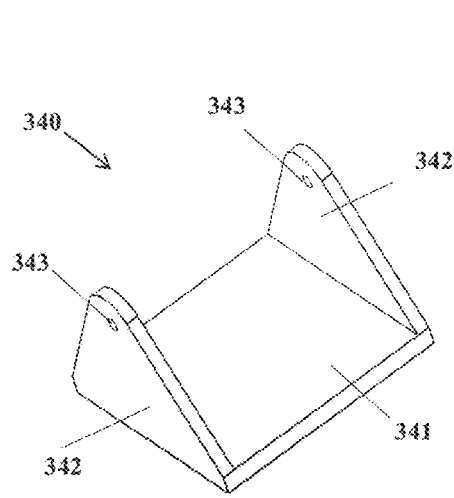
FIG. 13 illustrates a distal base according to an embodiment of the present invention.

FIG. 13 shows an embodiment of the distal base 340. The distal base 340 comprises a distal surface 341 (typically flat) configured to be attached to the proximal end of the present invention system arm 205. The distal base 340 comprises two side arms 342 extending proximally from the sides of surface 341. The two side arms 342 are typically flat and parallel to one another. The two side arms 342 each comprise a connecting means such that the arms 342 connect to the circumferential ring (at connecting points). Preferably, the arms 342 outer sides (not the sides that face each other) engage (and connect to) the inner side of the circumferential ring. The connection between the arms 342 and the circumferential ring is such that the circumferential ring is rotatable in relation to the arms 342 around an axis 385. Axis 385 is an imaginary line which passes through the connecting points between the arms 342 and the circumferential ring. Preferably, the connection between the arms 342 and the circumferential ring (at two of the circumferential ring opposite locations) is according to a revolute joint manner (wherein each connection point comprises a revolute joint).

According to one embodiment, the arms 242 connecting means are apertures 343 that face each other (e.g. that are parallel and aligned with each other). Accordingly the circumferential ring comprises corresponding pins fixedly insertable within said apertures 343.

The circumferential ring comprises a first pair of opposite connecting means and a second pair of opposite connecting means. Preferably, the imaginary line connecting the first pair is perpendicular to the imaginary line connecting the second pair. Optionally, the circumferential ring may comprise two opposite apertures and two opposite pins projecting inwards (towards its center). Preferably, the imaginary line connecting the center of the pins is perpendicular to the imaginary line connecting the center of the apertures. Preferably, the axes 385 and 380 do not pass through the center of the ball, but rather at a location proximally therefrom (e.g. at a location that is closer to the exposed portion of the ball, or at circular opening 321).

Figure 14:
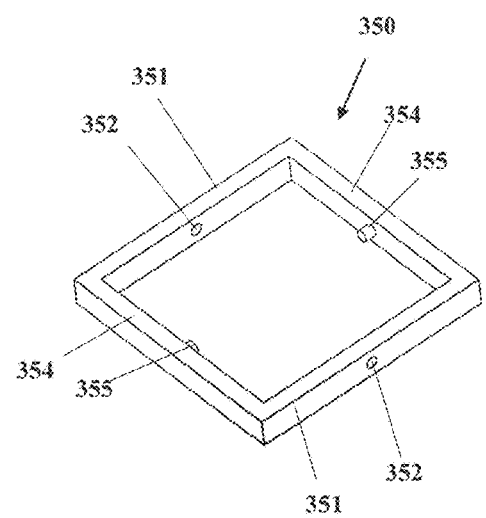
FIG. 14 illustrates a circumferential ring according to an embodiment of the present invention.

The circumferential ring may comprise a circular shape. FIG. 14 shows an embodiment of the circumferential ring 350. The circumferential ring 350 comprises a square or rectangular shape. Circumferential ring 350 comprises two opposite parallel arms 351, each comprising a central aperture 352 located at (or near) its middle. Circumferential ring 350 comprises two opposite parallel arms 354, each comprising a central pin 355 located at (or near) its middle, projecting inwards (towards the center of the square/rectangular shape).

Figure 15E:
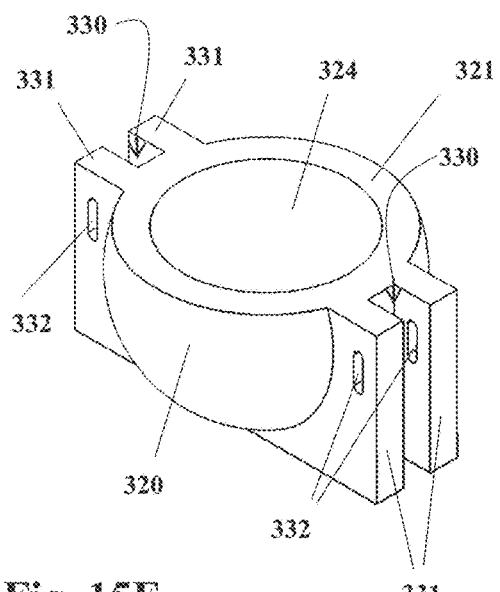
FIGS. 15E-15F illustrate a ball encasing element according to an embodiment of the present invention.

FIG. 15A shows an embodiment of the braking unit 311. The braking unit 311 comprises a hollow ball encasing element 320 (perspective view in FIG. 15E and view of its distal side in FIG. 15F). The hollow ball encasing element 320 interior surface 324 comprises a round portion in the form of the majority of an outer surface of a ball. In other words the interior surface 324 of ball encasing element 320 comprises a distal ball apex that widens proximally in the shape of a ball until the maximum ball circumference ($2\pi r$, r being the ball radius) and then decreases (in the shape of the continuation of the ball), and terminates at round circular opening 321 at the proximal end of encasing element 320. Actually, the area of distal ball apex of interior surface 324 is located where an aperture (336) is placed, as will be explained hereinafter, but the general concept of interior surface 324 is clear. The circular opening 321 comprises a circular shape with a circumference smaller than $2\pi r$ such that ball 318 may be encased therewithin. Part of ball 318 is proximal beyond circular opening 321.

The braking unit 311 further comprises a distal stopper unit 360. The distal stopper unit 360 is connected to the ball encasing element 320 such that ball encasing element 320 is movable in relation to the distal stopper unit 360. The general direction that the ball encasing element 320 is movable in relation to the distal stopper unit 360 is the distal-proximal direction. The gimbal gyroscopic structure enables the general orientation of the braking unit 311 to be in a distal-proximal orientation with side deviations. Thus, the encasing element 320 is substantially movable in the general distal-proximal direction (in relation to stopper unit 360) even with the side deviations. Preferably, the ball encasing element 320 is movable in relation to the distal stopper unit 360 within a certain range.

Figure 15F:
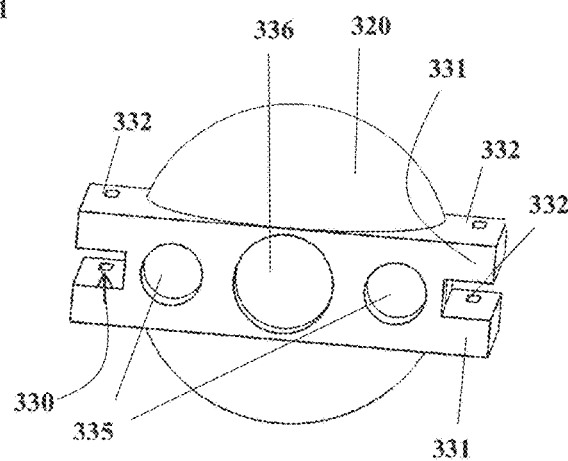
Figure 15G:
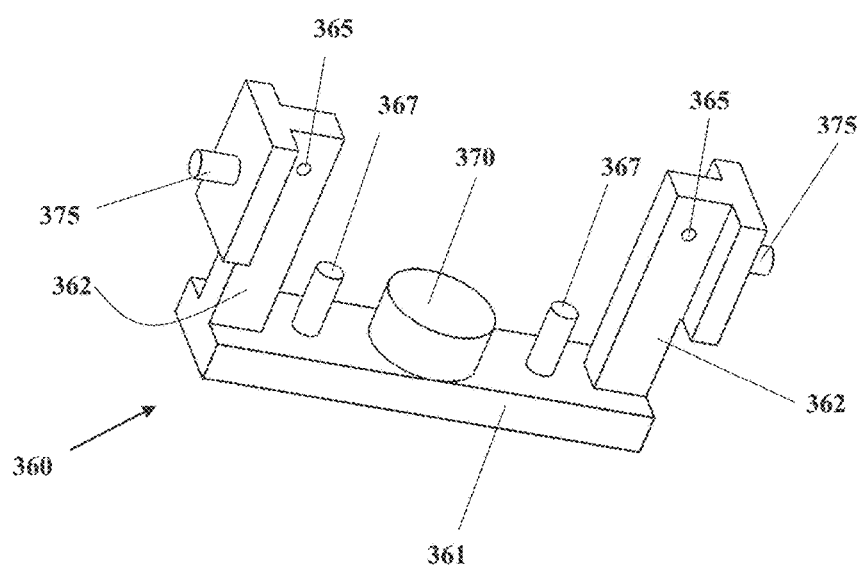
FIG. 15G illustrates a stopper unit according to an embodiment of the present invention.

The encasing element 320 comprises a distal aperture 336 (shown in FIG. 15F). The distal stopper unit 360 comprises a central stopper element 370 placed distal to the ball encasing element 320 such that when the ball encasing element 320 moves distally in relation to the distal stopper unit 360 the central stopper 370 passes through the distal aperture 336 and engages the ball 318 and immobilizes it. At least one elastic element (e.g. spring) is placed between a proximal end of a portion of the stopper unit 360 (distal to the encasing element 320) and the encasing element 320, such that the elastic element is configured to apply a force that separates said proximal end of a portion of the stopper unit 360 (placed distal to ball encasing element 320) from the ball encasing element 320. When the elastic element is contracted the encasing element 320 moves towards said proximal end of a portion of the stopper unit 360 (placed distal to ball encasing element 320).

According to one embodiment, the ball encasing element 320 comprises two side channels 330 placed at the sides of the round portion of ball encasing element 320. The side channels 330 are straight and in the distal-proximal direction. For each channel, two side surfaces 331 (typically straight, flat and parallel to one another) extend sideways outwards from the round portion such that the channel 330 is bounded by the surfaces 331 and the external distal side of the round portion of ball encasing element 320. Thus the open portions of the channels face away from the round portion of ball encasing element 320. For each channel the side surfaces 331 each comprise an elongated (typically straight) aperture 332 that face each other (and that are parallel and aligned to one another).

The distal side of ball encasing element 320 comprises a distal aperture 336 (from the distal end and to the interior surface of the round portion). Preferably, the distal side of ball encasing element 320 comprises two side distal recesses 335 (typically round) engageable with elastic elements (explained hereinafter).

The distal stopper unit 360 comprises a distal arm 361 perpendicular to both channels 330. The distal stopper unit 360 comprises two side arms 362 extending proximally from the sides of arm 361. The side arms 362 are complementary to the channels 330 and are configured to move distally and proximally therein (along the channels). The side arms 362 comprise apertures 365 aligned with a portion of the elongated straight apertures 332 of a corresponding channel 330. In other words the apertures 365 are always aligned with a portion of the elongated apertures 332, the portion depending on the location/position of braking element 311 in relation to stopper unit 360 (i.e. when braking element 311 is most far away (after moving proximally) from arm 361 of stopper unit 360 the apertures 365 are aligned with the most distal portions of elongated apertures 332 and when braking element 311 is most close (after moving distally) to arm 361 of stopper unit 360 the apertures 365 are aligned with the most proximal portions of elongated apertures 332). Pins 366 are inserted (typically tightly inserted) within apertures 365 extending from both sides of the aperture. The distal arm 361 comprises two pins 367 extending proximally therefrom, each pointing towards a side recess 335 corresponding thereto. The distal arm 361 comprises a central stopper 370 (typically having a cylindrical shape) extending proximally therefrom (typically from a middle portion of distal arm 361) and configured to protrude through aperture 336 corresponding thereto. The braking unit 311 comprises two elastic elements, e.g. springs 368, such that each of the two pins 367 are inserted through its corresponding spring 368. The springs 368 proximal sides are each engageable with the distal surface of ball encasing element 320 (preferably at corresponding recess 335. Thus the pins 367 maintain the springs in place such that the springs 368 proximal sides engage recesses 335, such that they are configured to push ball encasing element 320 with their spring force.

Distal stopper unit 360 comprises two side connecting means, e.g. pins 375 extending sideways and outwards. The two side pins 375 are parallel to distal arm 361.

The braking unit 311 is constructed as follows. The ball 318 is encased within the round portion of encasing element 320. The distal stopper unit 360 is positioned such that the side arms 362 are placed within channels 330 and are configured to move distally and proximally therein. Each pin 366 is inserted within the two elongated straight apertures 332 of a corresponding channel 330 such that the distal/proximal movement of ball encasing element 320 in relation to stopper unit 360 is limited accordingly. FIG. 15B shows the braking unit 311, FIG. 15C shows the braking unit 311 without the encasing element 320 and FIG. 15D—additionally without the stopper unit 360.

Finger 310 is constructed as follows. The two side pins 375 of braking unit 311 are each inserted within a corresponding aperture 352 of circumferential ring 350. Thus braking unit 311 is rotatable around a first axis 380 (shown in FIG. 12A). Each central pin 355 of circumferential ring 350 is inserted within its corresponding aperture 343 of distal base 340. Thus circumferential ring 350 and braking unit 311 (connected thereto) are rotatable around a second axis 385. First axis 380 is an imaginary line that passed through pins 375 and second axis 385 is an imaginary line that passed through pins 355. Preferably, axes 380 and 385 are perpendicular to each other. Preferably, axes 380 and 385 are on the same plane.

It should be understood that the connection between the braking unit 311 and the circumferential ring 350 is such that braking unit 311 is rotatable in relation to the circumferential ring 350 around an axis 380. The braking unit 311 connects to two opposite sides of the inner surfaces of the circumferential ring 350. Axis 380 is an imaginary line which passes through connecting means between the circumferential ring 350 and braking unit 311. Preferably, the connection between the circumferential ring 350 and braking unit 311 (at two of the circumferential ring opposite locations) is by a revolute joint manner.

It should be understood that the certain connecting means forming the revolute joints according to this embodiment may be alternately changed and used with other complementary corresponding connecting means. In other words instead of arms 351 comprising apertures 352 and arms 362 comprising pins 375—arms 351 may comprise pins extending inwards and arms 362 may comprise corresponding apertures. Also instead of arms 342 comprising apertures 343 and arms 354 comprising pins 355—arms 342 may comprise pins extending inwards and arms 354 may comprise corresponding apertures.

Thus the rotation around two axes enables the proximal portion of ball 318 (engageable with the object to be grasped) may tilt in many directions (around the general proximal direction). Typically, the ball 318 radius is slightly smaller than the radius of the interior surface 324 of ball encasing element 320 so as to enable the ball 318 to be freely rotatable in any direction (with minimal friction).

As the distal sides of fingers 310 are attached to the proximal sides of arms 205, when engaging the object to be grasped and applying force thereon the object reorients to its steady state as the balls 318 rotate and reorient according to the force directions applied (as the fingers 310 are frictionless). The plane defined by the two axes (in the preferable embodiment wherein they define a common plane) is parallel to the tangent surface of a contact point. This is because any force applied at the contact point by the ball creates a torque around the gimbal mechanism which is proportional to the force, the degree of non-parallelism between the tangent plane and the axes plane, and the distance between the axes plane and the center of the ball. In other words, any force vector applied to the ball naturally re-orients the gimbal mechanism so that the axes plane is normal to the force vector. When the steady state is reached and a normal force is applied to the balls 318, the normal force does not move the encasing element 320 until it exceeds the force of the springs 368. The normal force is applied in the general distal direction. When the normal force exceeds the force of the springs 368 (placed between the proximal side of distal arm 361 and distal side of encasing element 320) the springs contract and encasing element 320 moves distally towards arm 361. At a certain point the central stopper 370 protrudes aperture 336 and engages the distal part of ball 318. The normal force applied and the friction between the central stopper 370 and the distal surface of ball 318 that it engages causes the ball 318 to be immobilized and thus frictional. Thus the proximal portion of ball 318 that engages the object to be grasped is immobilized and a frictional grasp is obtained. After the system arms 205 release the grasped object the normal force ceases and thus the spring force (or in case of another elastic element—the corresponding elastic pushing force) of springs 368 cause springs 368 to expand to its regular length pushing the encasing element 320 to move proximally away from 361, and thus ball 318 ceases to engage central stopper 370. Accordingly ball 318 becomes once again freely rotatable in any direction, and the finger 310 becomes frictionless.

According to an embodiment of the present invention, the two axes (380 and 385) are substantially on the same plane and do not pass through the center of the ball 318, but are at some small distance from the ball's center. Any force applied to the ball 318 by an object in contact with it has a normal vector that passes through the center of the ball 318. This force vector does not generically pass through either of the axes (380 and 385), and therefore a torque is created about each of the axes (380 and 385). This torque creates a movement in each axial direction in the direction of torque minimization. Once the torque reaches zero, the force vector passes through both the ball's center and both of the axes (380 and 385). At this point, the gimbal mechanism is oriented in a way that the contact force vector defines a plane, to which both axes (380 and 385) are parallel. This concept is essentially analogous to the 2D implementation of the first aspect of the invention (with the roller embodiment), with the addition of a second axis.

According to this aspect of the present invention, additional springs (e.g. of different lengths and stiffness) may be added to or may replace the springs (228, 368) in order to change the normal force threshold.

The gimbal gyroscopic embodiment hereinabove was explained according to a certain embodiment of the present invention. Other gimbal gyroscopic embodiments may include, for example, a ball encasing element with a distal opening and a proximal opening with the ball extending distally therefrom and proximally therefrom respectively. According to this, the ball encasing element surrounds the maximal circumference of the ball and a distal portion therefrom and a proximal portion therefrom such that the ball is maintained therein and rotatable in any direction. In this case a stopper element of the stopper unit will engage the distal portion of the ball that protrudes the distal opening distally.

Orientation sensors such as optical encoders or potentiometers (coupled to the system controller) can be used on the gimbal mechanism in order to measure the tilt of each of the two axes. This measurement provides the axes plane, which is parallel to the contact point tangent plane on the touched object (explained hereinabove). In the orthogonal surfaces embodiment (referring to finger 210), distance sensors can be used to measure the distance between the cup triangular faces and the encasing element's triangular faces. The distance ratios may also provide with the object's surface normal vector. This orientation information can be used to determine the object's pose during finger retraction and upon grasping, in order to estimate grasping progress and detect placement errors.

Braking can be detected by means of a physical contact sensor, such as a microswitch or other means of closing an electric circuit by contact between the balls 218 and 318 with the surface 216 and stopper element 370 respectively. The physical contact sensor is coupled to the system control unit. This detection may assist the system in determining the grasp state. Fingers that are determined as "braked" by means of this sensor are friction contacts, while fingers that are not determined as "braked" are frictionless contacts (enabling the balls to spin/rotate).

Optionally, the system comprises force sensors attached to the stopper element 370 or on surfaces 216 (coupled to the control unit) used to determine the normal force applied by each finger to the object (or the normal force applied to each finger by the object).

Figure 16:
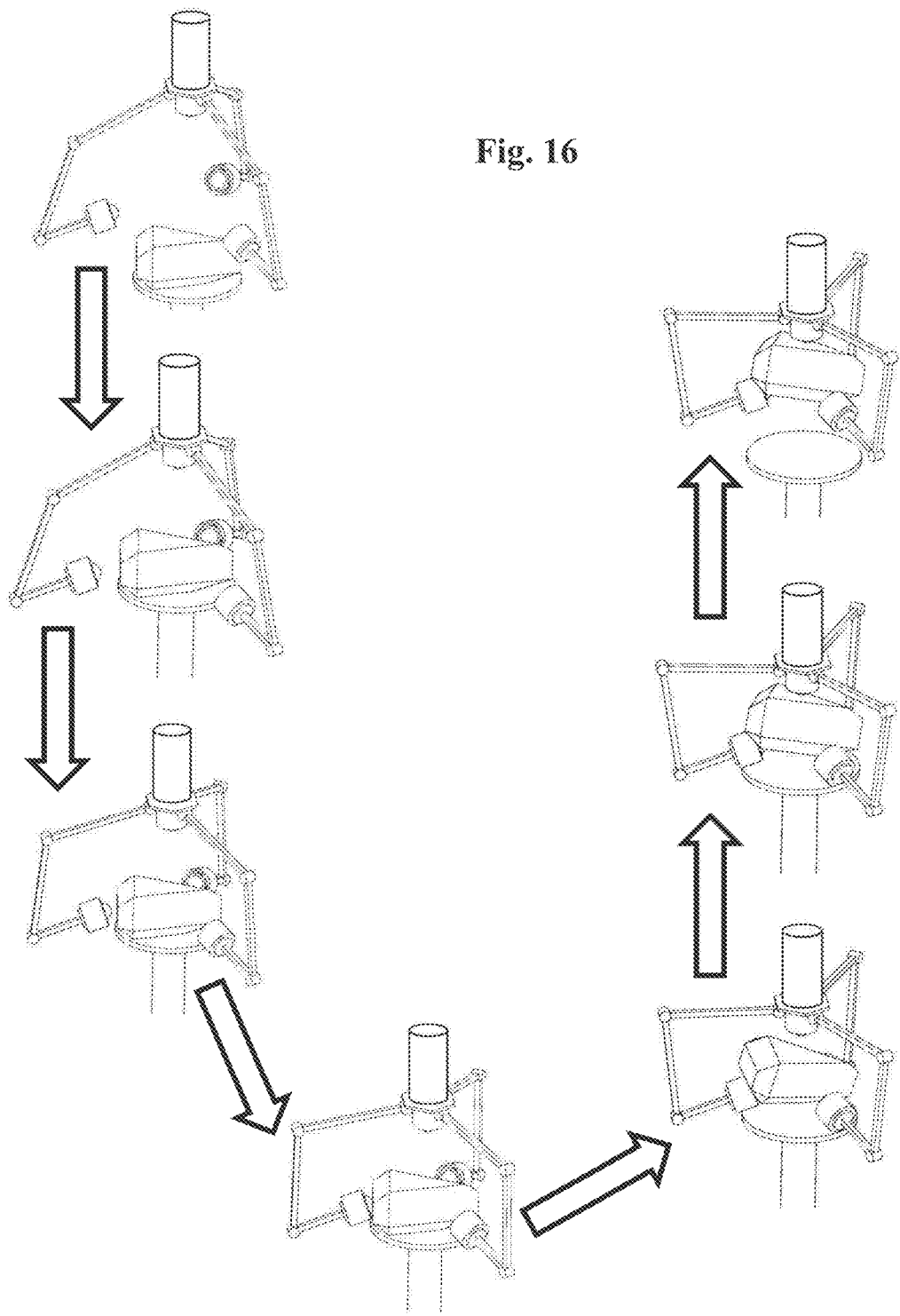
FIG. 16 illustrates a sequence of closure of the gripper fingers on an object and reorientation according to an embodiment of the present invention.

FIG. 16 shows the engagement and orientation of an object by the gripper fingers of the present invention. Seven images are shown sequentially wherein the balls engage a 3D object and reorient the object to the optimal steady state position in the spatial range for an immobilizing grasp. After reaching the optimal position the fingers become frictional thus obtaining a robust frictional immobilizing grasp. The object begins to change orientation once a first finger touches it, wherein usually not all fingers will touch simultaneously. Instead, the first finger engages, then a second finger, then a third and finally the fourth. Each finger engagement affects the reorientation in accordance to the average force magnitude and direction that all fingers contribute to (the steps of the grasp are according to the arrows that appear in the figure).

The fingers 210, 310 (or the elements that the fingers comprised of) preferably comprise materials from the group consisting of plastic (3d printed), metal and steel. Optionally, the balls 218, 318 comprise a coating of latex or silicone rubber.

The arms 205 preferably comprise materials from the group consisting of metals and plastics.

A motor that can be used within revolute joints 202 is a stepper motor. An example of a model of the motor is the model—Dynamixel MX-106 motor.

The receiving cup 215 may preferably comprise materials from the group consisting of metal and plastic. Its length is preferably between 60 and 100 mm. Its diameter is preferably between 60 and 100 mm.

The ball (318, 218) is typically rigid and is typically made of high frictional material. The ball (318, 218) may preferably comprise materials from the group consisting of silicone, latex and aluminum. It may comprise hard rubber encasing a steel or other hard core. Its radius is preferably between 20 and 50 mm.

The encasing element 220 may preferably comprise materials from the group consisting of plastic or metal. Its length (from the distal end to proximal end) is preferably between 25 and 70 mm. Its diameter is preferably between 20 and 50 mm.

The distal base 340 may preferably comprise materials from the group consisting of metal and hard plastic. Its length (from the distal end to proximal end) is preferably between 60 and 100 mm. Its thickness is preferably between 3 and 8 mm.

The circumferential rectangular ring 350 may preferably comprise materials from the group consisting of metal and hard plastic. Its length is preferably between 60 and 100 mm. Its width is preferably between 60 and 100 mm. Its thickness is preferably between 3 and 8 mm.

The ball encasing element 320 may preferably comprise materials from the group consisting of hard plastic and metal. Its length (from the distal end to proximal end) is preferably between 40 and 60 mm. Its inner round surface radius is preferably between 15 and 40 mm.

Aperture 336 comprises a radius preferably between 5 and 20 mm. Recesses 335 comprise a radius preferably between 3 and 10 mm.

The distal stopper unit 360 may preferably comprise materials from the group consisting of metal and hard plastic. The spherical portion 370 may comprise a latex or silicone coating. Its length (from the distal end to proximal end) is preferably between 50 and 80 mm. Its width is preferably between 10 and 30 mm.

The channels 330 length (from the distal end to proximal end) is preferably between 20 and 50 mm. Its thickness is preferably between 3 and 8 mm. Its width is preferably between 5 and 12 mm.

Pins 367 may preferably have a length between 5 and 12 mm and a radius between 1 and 3 mm.

Pins 375 may preferably have a length between 2 and 6 mm and a radius between 1 and 4 mm.

Central stopper 370 may preferably have a length between 5 and 15 mm and a radius between 5 and 15 mm.

The springs are preferably linear springs.

The friction between the ball 218 and surface 216 and between ball 318 and stopper element 370 is preferably as high as possible. A typical example: a silicone-rubber coefficient of friction of 1.15.

A typical value of the coefficient of friction between rubber and steel (such as the contact between the ball and a steel object) is 0.7. A typical value of a rubber on rubber contact (the ball with the stopper element for example) is 1.15, etc. The higher the coefficients of friction is, the better. A good value would be anything above 0.5 (ballpark estimate).

The springs may be pre-compressed to allow a greater force threshold required to displace the elements that results in braking (for example, as the mechanism explained in relation to the first aspect of the present invention).

The present invention relates to a method according to this aspect of the present invention for grasping and displacing an object using the system with the balls 218, 318 as explained herein.

The present invention relates to a method for grasping and displacing an object comprising:
engaging said object with a plurality of movable fingers;
optimizing the grip with a substantially frictionless engagement;
immobilizing said object by adjusting frictional properties of said fingers.

The adjusting frictional properties may be carried out by increasing friction.

The adjusting frictional properties may comprise stopping the rotation of a ball (as explained herein).

Preferably, the stopping of the rotation of a ball is by deflecting the ball and engaging a portion of said ball with a stopping surface.

Preferably, the stopping of the rotation of a ball is by moving the ball in a general distal direction and engaging a portion of said ball with a stopper element.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A gripper finger comprising:
a movable base element connectable to a gripper arm;
a roller configured to spin around its central axis;
a stopper configured to stop and/or prevent the spinning of the roller around its central axis;
wherein the roller is mounted on a rod at its central axis;
wherein said rod is deflectable such that said roller is configured to engage the stopper.

2. The gripper finger according to claim 1, wherein said finger further comprises an elongated portion extending along an axis perpendicular to the central axis of the roller, with an aperture provided at the bottom of said elongated portion, wherein the rod is mounted such that it passes through said aperture; and
wherein the stopper is connected to said elongated portion at a location distal to said aperture.

3. The gripper finger according to claim 2, wherein the elongated portion is rotatable around an axis identical or parallel to the roller central axis and wherein the aperture is essentially elongated in the direction of the length of said elongated portion enabling the deflection of the rod.

4. The gripper finger according to claim 3, wherein the elongated portion is rotatable around an axis parallel to the roller central axis such that there is an offset between the central axis of the roller and the rotation axis of said elongated portion.

5. The gripper finger according to claim 4, wherein the central axis of the roller is distal to the central rotation axis of the elongated portion rotation.

6. The gripper finger according to claim 5, wherein the elongated portion is hollow and wherein an elastic element is placed within the hollow portion, wherein the rod is responsive to compression of said elastic element.

7. The gripper finger according to claim 5, wherein the base element comprises a hollow cylindrical tube extending therefrom;
wherein said finger further comprises a cylindrical portion connected to a proximal portion of the top of the elongated portion and inserted within said hollow cylindrical tube and rotatable therewithin;
wherein said hollow cylindrical tube and said cylindrical portion have a common central axis;
wherein said common central axis is the rotation axis of said elongated portion.

8. The gripper finger according to claim 7, wherein the elongated portion is hollow and wherein the cylindrical portion comprises a bore extending from the inside of the elongated hollow portion to within said cylindrical portion;
wherein said bore is substantially parallel to the rotation axis of said elongated hollow portion;

wherein the rod is placed within said bore; and
wherein the stopper extends from a distal portion of the bottom of the elongated hollow portion and is substantially parallel to the rotation axis of said elongated hollow portion.

9. A gripper system comprising:
a plurality of arms wherein the proximal ends of each of the arms are at close proximity to each other, wherein each of said arms comprises a mobile member movable thereon;
a motor configured to drive said mobile member;
a control unit;
a plurality of gripper fingers according to claim 1, each mounted on a corresponding mobile member of said mobile members.

10. A gripper finger comprising:
a ball encasing element;
a ball encased within said ball encasing element wherein a portion of said ball is proximal beyond said ball encasing element proximal side;
wherein said ball is configured move between two modes:
a) a frictionless mode wherein said ball is freely rotatable in any direction;
b) a frictional mode wherein the ball is immobilized;
wherein said gripper finger further comprises:
a hollow receiving cup comprising an opening at its proximal side and a plurality of surfaces within its interior;
a plurality of elastic elements;
wherein the ball encasing element comprises a distal side with a plurality of surfaces and a proximal side in the form of the majority of an external surface of a ball;
wherein said encasing element comprises an aperture within each of said distal side surfaces;
wherein said ball encasing element is placed within the interior of said receiving cup such that each of said ball encasing element distal side surfaces faces a corresponding surface from said hollow receiving cup internal surfaces; and wherein at least one of said plurality of elastic elements is placed between each of said encasing element distal side surfaces and its corresponding hollow receiving cup internal surface that it faces.

11. The gripper finger according to claim 10, wherein the ball encasing element distal side comprises three surfaces; and wherein the hollow receiving cup comprises three surfaces within its interior;
wherein the ball encasing element distal side three surfaces are orthogonal to one another; and
wherein the hollow receiving cup interior three surfaces are orthogonal to one another.

12. The gripper finger according to claim 10, wherein a portion of the ball encased within the ball encasing element protrudes the aperture;
wherein each ball encasing element distal surface is displaceable towards its corresponding receiving cup interior surface that it faces, such that the portion of the ball that protrudes the aperture of said ball encasing element distal surface is engageable with said corresponding receiving cup interior surface; and
wherein the ball and the receiving cup interior surface that it is engageable with are constructed such that there is friction upon their engagement.

13. The gripper finger according to claim 10, wherein the hollow receiving cup internal surfaces are concave spherical surfaces, such that they share a center point with each other and with the ball when said ball is in a resting position.

14. A gripper finger comprising:
a ball encasing element;
a ball encased within said ball encasing element wherein a portion of said ball is proximal beyond said ball encasing element proximal side;
wherein said ball is configured move between two modes:
a) a frictionless mode wherein said ball is freely rotatable in any direction;
b) a frictional mode wherein the ball is immobilized;
a distal base comprising a distal surface and two side arms extending proximally therefrom;
a circumferential ring connected to said distal base two side arms such that said circumferential ring is rotatable around a first axis;
a braking unit comprising:
a) the ball encasing element configured to encase a ball therewithin;
b) the ball encased within said ball encasing element;
c) a stopper unit connected to said ball encasing element such that said ball encasing element is movable in relation to said stopper unit;
wherein said braking unit is connected to said circumferential ring such that said braking unit is rotatable around a second axis.

15. A gripper finger according to claim 14, wherein the stopper unit comprises a distal portion distal to the ball; wherein said stopper unit distal portion comprises a stopper element extending proximally therefrom; and
wherein said stopper element is configured to engage and immobilize the ball.

16. A gripper finger according to claim 15, wherein the ball encasing element comprises:
a) an interior round surface in the form of the majority of an outer surface of a ball terminating at a proximal opening;
b) a distal aperture;
wherein a portion of the braking unit ball is proximal to said proximal opening;
wherein said stopper element is configured to pass through said ball encasing element distal aperture.

17. A gripper finger according to claim 14, wherein the ball encasing element is movable in relation to the stopper unit substantially in the distal and proximal direction.

18. A gripper finger according to claim 14, wherein at least one elastic element is placed between a portion of the stopper unit and the ball encasing element.

19. A gripper finger according to claim 14, wherein the connection between the distal base two side arms and the circumferential ring is such that each side arm is connected to a connection point on the circumferential ring by a revolute joint; and
wherein the connection between the braking unit and the circumferential ring is such that two sides of said braking unit are connected to connection points on the circumferential ring by revolute joints.

20. A gripper finger according to claim 14, wherein the first axis is perpendicular to the second axis.

21. A gripper finger according to claim 14, wherein the first axis and the second axis are on the same plane.

22. A gripper finger according to claim 14, wherein the ball encasing element comprises two side channels;
wherein the distal stopper unit comprises two side arms placed within said side channels and are configured to move distally and proximally therein;
wherein said side channels each comprise a pair of elongated aligned apertures;

wherein said distal stopper unit two side arms each comprise an aperture aligned with a portion of a corresponding pair of said pair of elongated aligned apertures;

wherein a pin is inserted through each of said pairs of elongated aligned apertures and said corresponding distal stopper unit side arm aperture.

23. A gripper system comprising:

a central arm connectable to a robotic maneuvering system configured to maneuver said central arm;

three arms extending proximally from said central arm, wherein each of said three arms comprises at least three revolute joints;

four gripper fingers, wherein one of said four gripper fingers is attached to the proximal end of said central arm and three of said four gripper fingers are each attached to the proximal end of a corresponding arm of said three arms;

at least one motor configured to radially displace said revolute joints;

a control unit;

wherein said gripper fingers each comprise:

a ball encasing element;

a ball encased within said ball encasing element wherein a portion of said ball is proximal beyond said ball encasing element proximal side;

wherein said ball is configured move between two modes:

a) a frictionless mode wherein said ball is freely rotatable in any direction;

b) a frictional mode wherein the ball is immobilized.

* * * * *